United States Patent

Nakatsuka et al.

[11] Patent Number: 6,084,374
[45] Date of Patent: Jul. 4, 2000

[54] CONTROLLER AND FILTER USED THEREIN

[75] Inventors: Takashi Nakatsuka, Sanda; Atsumi Hashimoto; Yasushi Mukai, both of Osaka; Kazuhito Ochiai, Toyonaka, all of Japan

[73] Assignee: Matsushita Electric Industrial Co., Ltd., Osaka, Japan

[21] Appl. No.: 09/159,624

[22] Filed: Sep. 24, 1998

[30] Foreign Application Priority Data

Sep. 26, 1997 [JP] Japan ................................ 9-261681

[51] Int. Cl.⁷ ........................ G05B 19/416; G05B 19/19
[52] U.S. Cl. .......................... 318/568.18; 318/568.1; 318/612; 318/613; 318/618
[58] Field of Search ..................... 318/560–696; 395/96, 95; 364/724, 715.06; 414/744.2

[56] References Cited

U.S. PATENT DOCUMENTS

| | | | |
|---|---|---|---|
| 4,554,497 | 11/1985 | Nozawa et al. | 318/636 |
| 4,603,286 | 7/1986 | Sakano | 318/615 |
| 4,634,946 | 1/1987 | Moulds, III et al. | 318/561 |
| 4,703,447 | 10/1987 | Lake, Jr. | 364/724 |
| 4,819,184 | 4/1989 | Jonsson et al. | 364/513 |
| 4,819,197 | 4/1989 | Blais | 364/715.06 |
| 4,916,636 | 4/1990 | Torii et al. | 364/513 |
| 5,057,756 | 10/1991 | Hara | 318/569 |
| 5,151,007 | 9/1992 | Maruo | 414/744.2 |
| 5,259,387 | 11/1993 | dePinto | 128/696 |
| 5,294,873 | 3/1994 | Seraji | 318/568.1 |
| 5,325,467 | 6/1994 | Torii et al. | 395/96 |
| 5,331,264 | 7/1994 | Cheng et al. | 318/568.11 |
| 5,434,489 | 7/1995 | Cheng et al. | 318/568.15 |
| 5,646,493 | 7/1997 | Hara et al. | 318/568.17 |

FOREIGN PATENT DOCUMENTS 5-46234 2/1993 Japan .

Primary Examiner—Paul Ip
Attorney, Agent, or Firm—Wenderoth, Lind & Ponack, L.L.P.

[57] ABSTRACT

The controller comprises (a) an interpolation calculator for dividing move data of a robot arm tip position into each sample period, the data fed from a position teaching section, (b) a load inertia calculator, (c) a gravity torque calculator, (d) acceleration and deceleration (A & D) time calculator for calculating an optimum A & D time by using the load inertia calculated by the load inertia calculator and the gravity torque calculated by the gravity torque calculator, (e) an A & D processor for providing an A & D process to move data of each sample time calculated by the interpolation calculator based on the A & D time calculated by the A & D time calculator, and (f) position controllers for controlling each motor based on the move data processed by the A & D processor. The A & D time is calculated with the following equation:

$$T = \alpha \cdot (J_m + J_L)/(T_m - T_L) \cdot V$$

where: V=desirable speed, $J_m$=motor inertia, $J_L$=load inertia, $T_m$=motor torque, $T_L$=disturbance torque including gravity torque, $\alpha$=proportional coefficient and T=A & D time. The robot having the above construction can figure out an optimum A & D time by considering change of load inertia and also that of gravity torque produced by a posture change of the robot, whereby A & D time can be varied. As a result, the robot can be operated at a higher speed.

35 Claims, 18 Drawing Sheets

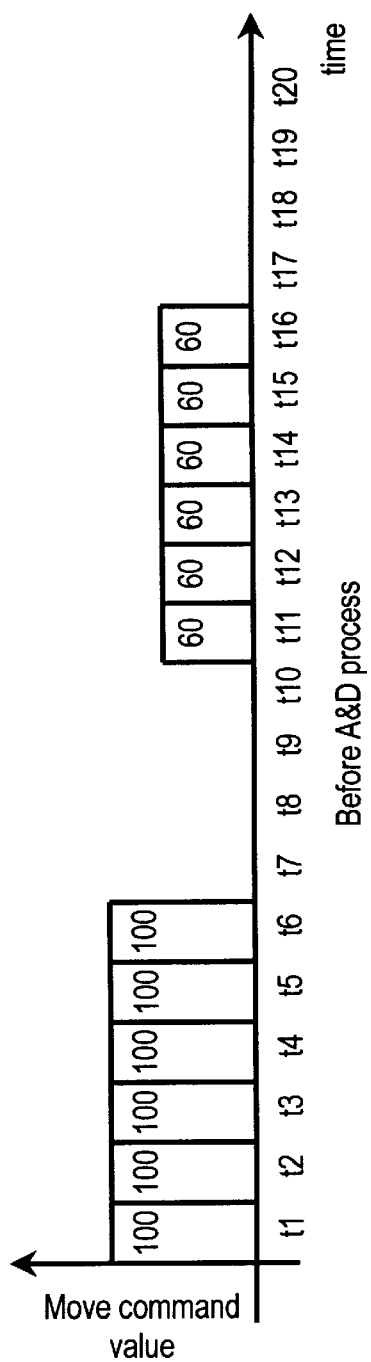
FIG. 5A
FIG. 5B
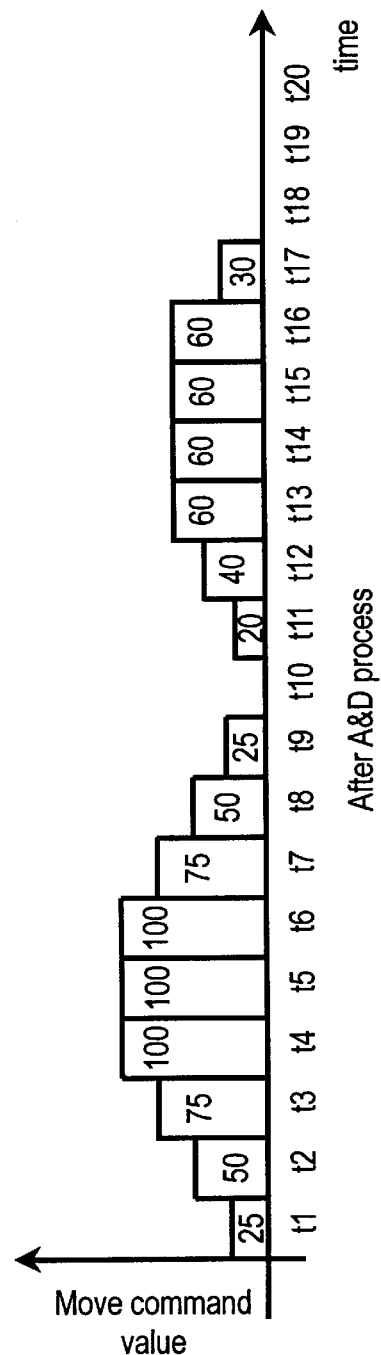
FIG. 5C

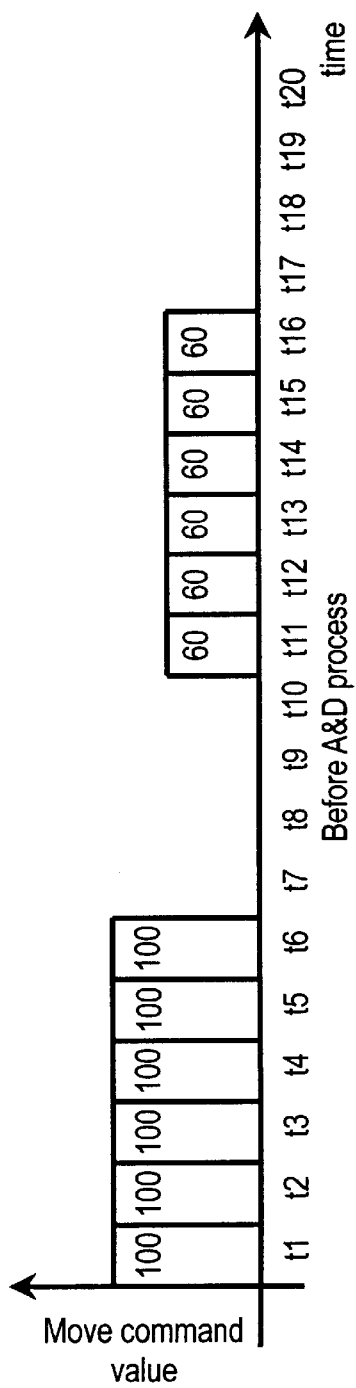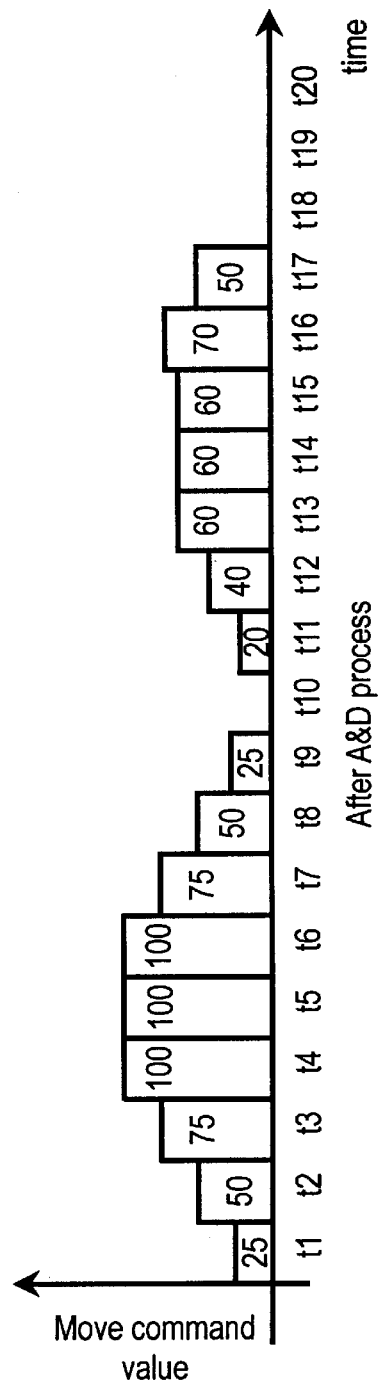
FIG. 9A
FIG. 9B
FIG. 9C
FIG. 9D

CONTROLLER AND FILTER USED THEREIN

FIELD OF THE INVENTION

The present invention relates to a controller that controls acceleration and deceleration of motors, and a digital filter utilized in the controller.

BACKGROUND OF THE INVENTION

Motors that drive robot arms through acceleration and deceleration (hereinafter referred to "A & D") have been controlled so that the robot arms operate smoothly free from shocks. Necessary time for A & D is determined by factors such as load applied to a motor, motor inertia, motor torque and a motor speed. Some fixed value calculated from a minimum or a maximum load inertia is thus utilized as an acceleration time. However, a robot changes its posture through operation, which accompanies changes of load and gravity torque applied to the robot. And yet, the robot arms are still requested to operate smoothly even with a shorter moving time by overcoming these changes. For this purpose, Japanese Patent Application unexamined Publication No. H05-46234 discloses a method for changing A & D process responsive to load inertia.

FIG. 16 depicts this conventional structure of A & D process, which is now discussed hereinafter by referring to FIG. 16. First, the position data of the robot arm tip obtained from a position teaching section 6 is divided into move data per sample period by an interpolation calculator 7. At this time, the move data is processed by an A & D processor 8 so that A & D can be operated. Prior to the A & D process, a load inertia responsive to a posture stored in a load inertia parameter storage 29 is selected according to the tip position data of the robot arm tip. Necessary time for A & D operation is calculated in an A & D time calculator 13 by using the load inertia value. The move data, calculated in the interpolation calculator 7 and undergone A & D processor 8 based on the A & D operation time calculated in the A & D time calculator 13, is given into a position controllers 9 and 10, whereby motors 1 and 2 are controlled.

In addition, a filter circuit that performs A & D process with a simple structure is disclosed in Japanese Patent Application unexamined Publication No. S59-90107. This prior art relates to FIR (finite impulse response) filter having a low pass characteristic. This FIR filter performs A & D process using a shift register having N steps (N=natural number). FIG. 17 depicts this A & D process with the shift register having four steps. A move command generator 15 generates a move command for driving the motor 1 to move the robot arm. The A & D processor 8 comprises; (a) registers 100–102, (b) multipliers 200–203 and (c) adders 300–302, and these elements constitute a four-step-FIR-filter having the low pass characteristic. The move command is fed into the A & D processor 8 from a move command generator 15. The move command value fed into the A & D processor 8 shifts through the registers 100–102 one by one for each sample period. The multipliers 200–203 are coupled with input sides of each register and the output side of the multiplier 203 (the final step), whereby the move command value that shifts one by one is multiplied by a coefficient in the multipliers 200–203. Outputs from the multipliers 200–203 are added one after another by the adders 300–302. The coefficients used in the multiplication sum up to 1 (one), and the total output added by the adders 300–302 agrees with a total of input move command values.

A move command is given to the A & D processor with a four-step-shift-register in FIG. 17. An operation of this example is described by referring to FIG. 18. The move command value (100 pulses) is fed into each sample period (t1–t6), and another command value (60 pulses) is fed into other respective sample periods (t11–t16). Each coefficient of the multipliers 200–203 is assigned to ¼ so that the total of all the coefficients is 1 (one). Accordingly, in the sample period t1, a move value (25 pulses, i.e., 100 pulses×¼) is tapped off after running through the adders 300–302. In the sample period t2, the move command value is shifted by the shift register and fed into the multiplier 201 where the command value is multiplied by ¼. The outputs from the multipliers 200 and 201 are added in the adders 300 through 302, and 50 pulses are supplied. In the same manner, the output from the multiplier 202 is added in the sample period t3, thereby outputting 75 pulses. In the sample period t4, the output from the multiplier 203 is also added, then 100 pulses are supplied. As a result, 100% output is obtained in the sample period t4. Therefore, an acceleration time is found in multiplying one sample time by a number of steps of the shift register (in this case "4").

In the sample period t7, no input to the multiplier 200 results in no output therefrom, and the adder 302 thus outputs 75 pulses. In the same manner, in the sample period t8, no output from the multiplier 201 results from no input thereto, and the adder 302 thus outputs 50 pulses. In the sample period t10, no input at all to the multipliers 200–203 results in no output from the adder 302. Since 0% output is obtained from the sample period t10, a deceleration time is found in multiplying one sample time by a number of steps of the shift register.

The operation for the sample periods t11 through t20 is the same as that for t1 through t10 except the move command value (60 pulses instead of 100 pulses), the description is thus omitted here.

However, the above A & D process performed by the controller and filter still leaves some problems.

In the A & D process by the conventional controller, the time necessary for A & D is determined by considering only load inertia relative to a posture change of the robot. However, a time of A & D necessary for a smooth operation should be determined by not only load inertia but also motor inertia and motor torque. A change of robot posture also accompanies a change of gravity torque by great amount. This gravity torque corresponds to a loss portion of the motor torque. In the conventional A & D process, only load inertia due to a posture change of the robot has been taken into account. The time of A & D has been thus determined by considering the maximum change of the gravity torque, or that has been determined by neglecting this change in the case that the robots have small changes in gravity torque. As such, a longer time than an optimum A & D time has been established for the robots having great changes in gravity torque, which has prevented robots from operating at a higher speed.

The conventional FIR filter cannot change a cut-off frequency under a condition of maintaining the agreement of a total number of input pulses with a total number of output pulses.

In the A & D process using the conventional filter, the A & D time is determined by a number of shift register steps only, and then coefficients are determined so that they sum up to 1 (one), whereby an input of the move command value can be equal to that of output. If a number of shift register steps are changed after the move command is fed to the filter circuit, the input total of move command values hardly does agree with that of the output. A change of the number of shift registers during the robot operation would cause errors in the command values fed into motors, which prevents an accurate positioning.

As such, the A & D process with the conventional filter does not allow the A & D time to be changed because the cut-off frequency is fixed. It is impossible therefore to always set an optimum A & D time responsive to a posture change of a robot. As a result, an optimum performance at a high speed has not been realized so far.

SUMMARY OF THE INVENTION

The present invention addresses the above problem and aims to enable a robot to perform at a higher speed through the following approach:

(1) calculate gravity torque responsive to every posture change of a robot, (2) calculate an acceleration and deceleration (A & D) time considering not only a change of load inertia but also that of gravity torque, (3) provide a variable control so that the A & D time becomes always optimum.

In order to achieve the above objective, the robot controller of the present invention comprises the following elements:

(a) an interpolation calculator which divides the move data of robot arm tip that is supplied from a position teaching section into the move data for each sample period, (b) a load inertial calculator that calculates load inertia, (c) a gravity torque calculator that calculates gravity torque, (d) an A & D time calculator that figures out an optimum A & D time using the load inertia and the gravity torque, (e) an A & D processor that processes the move data for each sample period calculated by the interpolation calculator by using the A & D time, (f) a plurality of positioning controllers, each assigned to respective motors for controlling based on the move data processed by the A & D processor.

The robot controller constructed as above calculates gravity torque responsive to every posture change of the robot, and calculates an optimum A & D time by considering not only a change of load inertia but also that of gravity torque, thereby enables the A & D time to be variable. As a result, the robot can be operated at a higher speed.

BRIEF DESCRIPTION OF THE DRAWINGS

FIG. 5 depicts an operation of the A & D processor in FIG. 4.

FIG. 9 depicts an operation of the A & D processor in FIG. 8.

DESCRIPTION OF THE PREFERRED EMBODIMENTS

Figure 3C:
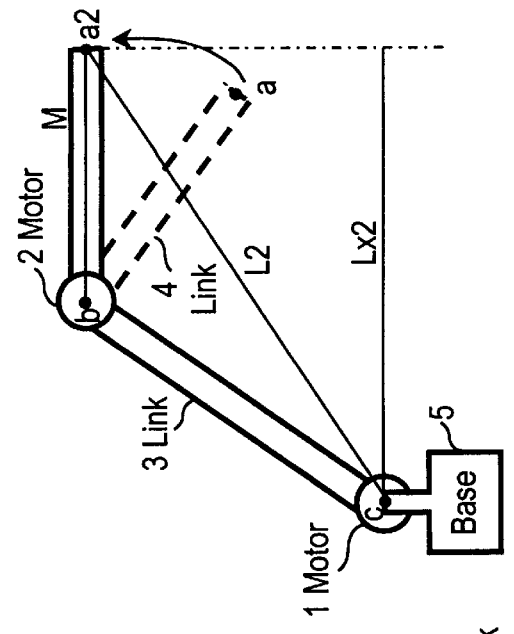
FIG. 3 depicts a structure of a robot arm having two degrees of freedom (two free points).

To make a complex description simple, the following robot-arm is referred to an example: the robot arm depicted in FIG. 3, comprising motors 1 and 2, links 3 and 4, and a base 5, and having two degrees of freedom (two free points).

Exemplary Embodiment 1

Figure 1:
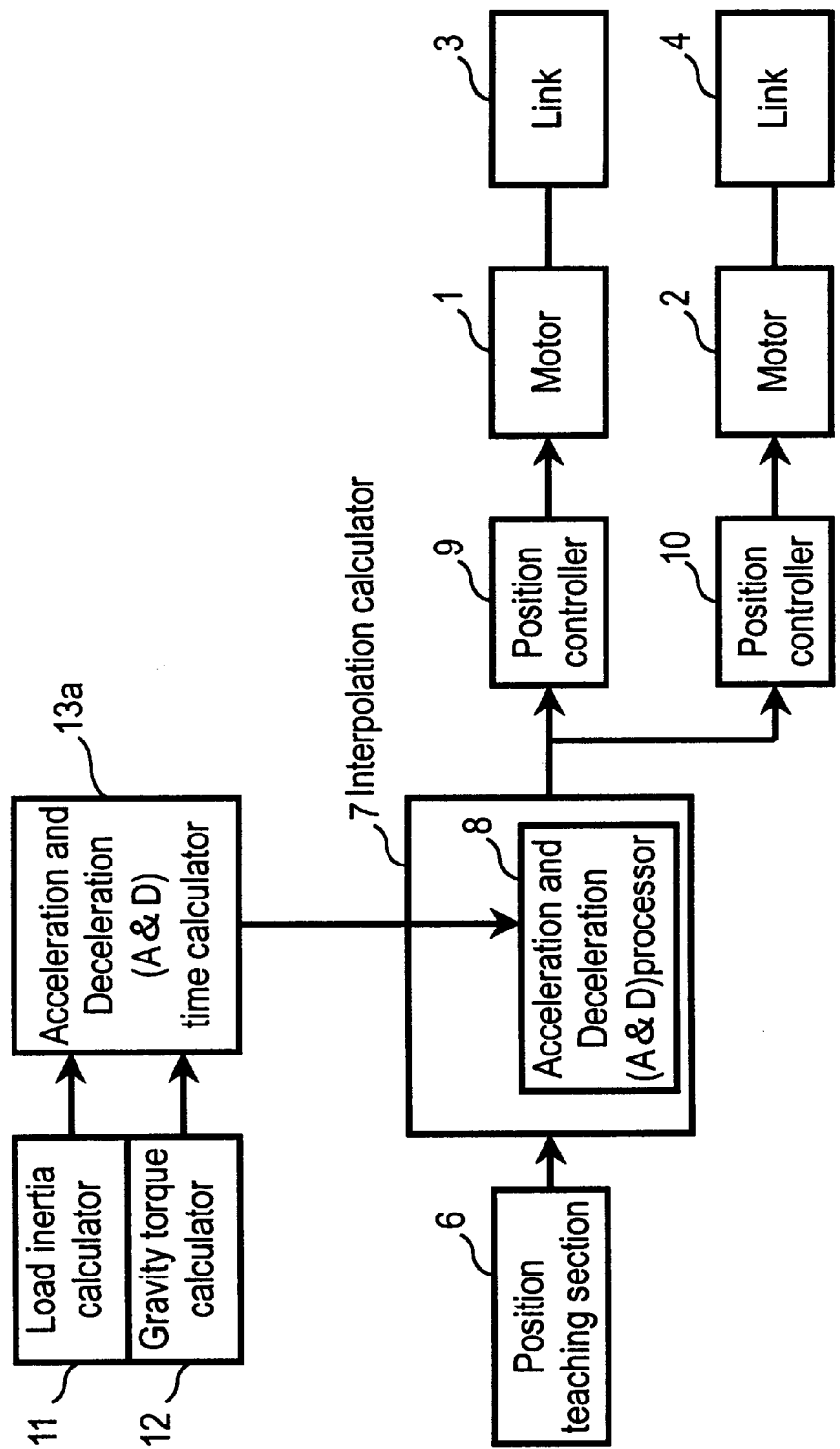
FIG. 1 is a block diagram depicting a structure of an essential part of the controller used in a first exemplary embodiment.

FIG. 1 is a block diagram depicting a structure of an essential part of the controller used in the first exemplary embodiment. A position teaching section 6 in FIG. 1 outputs position move data of a robot arm tip. The position move data supplied from the position teaching section 6 are divided into move data for each sample period by an interpolation calculator 7. Load inertia is calculated in a load inertia calculator 11, and gravity torque is calculated in a gravity torque calculator 12. An A & D time is calculated in an A & D time calculator 13a based on the load inertia and the gravity torque. Move data subjected to the A & D processor 8 is produced by using the move data divided into each sample period in the interpolation calculator 7 and an A & D time calculated in the A & D calculator 13a. The move data subjected to the A & D processor is sent to positioning controllers 9 and 10. The controller 9 calculates a positioning control command of a motor 1, thereby controlling the motor 1. The controller 10 calculates a positioning control command of a motor 2, thereby controlling the motor 2.

Calculations of load inertia and gravity torque, and a calculation of the A & D time using the load inertia as well as the gravity torque are described by referring to FIG. 3.

Figure 3B:
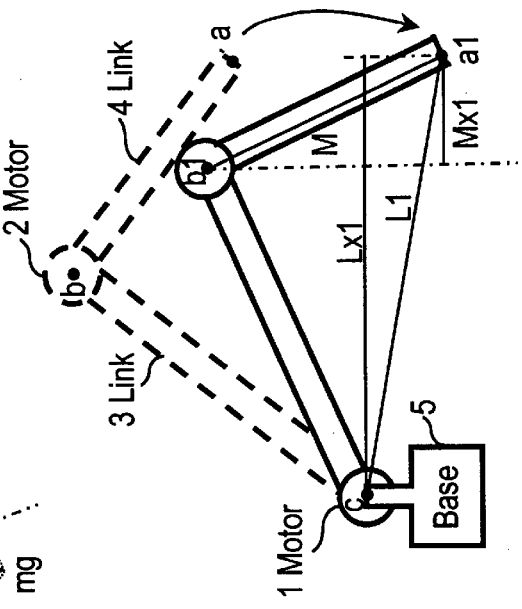
Figure 3A:
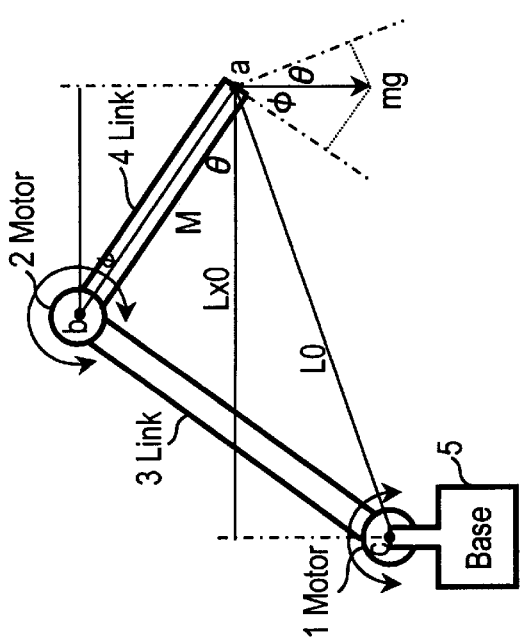

As shown in FIG. 3(a), first, couple the link 3 to a rotating shaft of the motor 1 mounted to the base 5, then mount the motor 2 to a tip of link 3. Further, couple the link 4 to a rotating shaft of the motor 2, whereby a robot arm is constructed. Control rotational angles of motors 1 and 2, thereby controlling a position of the tip "a" of the robot arm.

In this robot arm having two free points, when only the motor 1 at the posture shown in FIG. 3(a) is driven, the tip "a" of the robot arm moves to "a1" as shown in FIG. 3(b), which results in a posture change of the robot arm. When only the motor 2 at the posture shown in FIG. 3(a) is driven, the tip "a" of the arm moves to "a2", which results in a posture change of the robot arm.

In the posture shown in FIG. 3(a), assume that the gravity center of the robot arm is located at the arm tip, and where:

"$L_0$" is a distance between the motor 1 and the arm tip,

"M" is a distance between the motor 2 and the arm tip,

"m" is total mass of the motors 1 and 2, links 3 and 4, and assume that "m" is concentrated on the arm tip.

The load inertia of the motor 1 is expressed in "$m \cdot L_0^2$" and that of the motor 2 is expressed in "$m \cdot M^2$". When the arm tip moves to "a1", the distance between the motor 1 and the arm tip becomes "$L_1$", and the load inertia of the motor 1 becomes "$m \cdot L_1^2$". In the same manner, when the arm tip moves to "a2", the distance between the motor 1 and the arm tip becomes "$L_2$", and the load inertia of the motor 1 becomes "$m L_2^2$". As such the load inertia of the motor 1 changes responding to the distance between the motor 1 and the arm tip. However, because the distance "M" between the motor 2 and the arm tip stays same, the load inertia of the motor 2 is free from a posture change of the robot arm and stays at a constant value "$m \cdot M^2$". The distance between the motor 1 and the arm tip at the position "a1" is identical to that (distance $L_0$) between the motor 1 and arm tip "a", since the posture is changed by only the motor 1. Thus the load inertia of the motor 1 is "$M \cdot L_0$". This is an identical value to that at arm tip "a".

Next, assume that a vertical direction at right angles with a line between the motor 1 and the arm tip "a" and a gravity direction makes an angle θ, then gravity torque $T_{L0}$ applied to the motor 1 is expressed in the following equation:

$$T_{L0}=L_0/mg \sin \theta =mg \cdot L_{X0} \quad (1)$$

The gravity torque $T_{L0}$ is proportional to a horizontal component $L_{X0}$ of the distance $L_0$ between the arm tip "a" and the motor 1. Assume that a vertical direction at right angles with a line between the motor 2 and the arm tip "a" and a gravity direction makes an angle φ, then gravity torque applied to the motor 2 is expressed in the following equation:

$$T_{M0}=M_0 \cdot mg \sin \phi =mg \cdot M_{X0} \quad (2)$$

The gravity torque $T_{M0}$ is proportional to a horizontal component $M_{X0}$ of the distance M between the motor 2 and the arm tip "a".

When the robot arm changes its posture as shown in FIG. 3(b), i.e., the arm tip moves to "a1", then the gravity torque applied to the motor 1 changes to $mg \cdot L_{X1}$, and that applied to the motor 2 changes to $mg \cdot M_{X1}$. Further, when the arm tip moves to "a2", the gravity torque to the motor 1 changes to $mg \cdot L_{X2}$, and that to the motor 2 changes to $mg \cdot M_{X2}$. As such, when distances from the motor 1 and motor 2 to the arm tip vary due to posture changes of the robot arm, both of the load inertia and gravity torque applied to respective motors also vary.

An A & D time "T" necessary for reaching a target velocity "V" without overshoot is expressed in the following equation:

$$T=\alpha \cdot (J_m+J_L)/(T_m-T_L) \cdot V \quad (3)$$

where: $J_m$=motor inertia, $J_L$=load inertia, $T_m$=motor torque, $T_L$=disturbance torque including gravity torque, and α=proportional coefficient.

In the A & D time calculator 13a, an optimum A & D time is calculated based on the above equation using load inertia and gravity torque both obtained from the arm postures during each sample period.

Exemplary Embodiment 2

Figure 2:
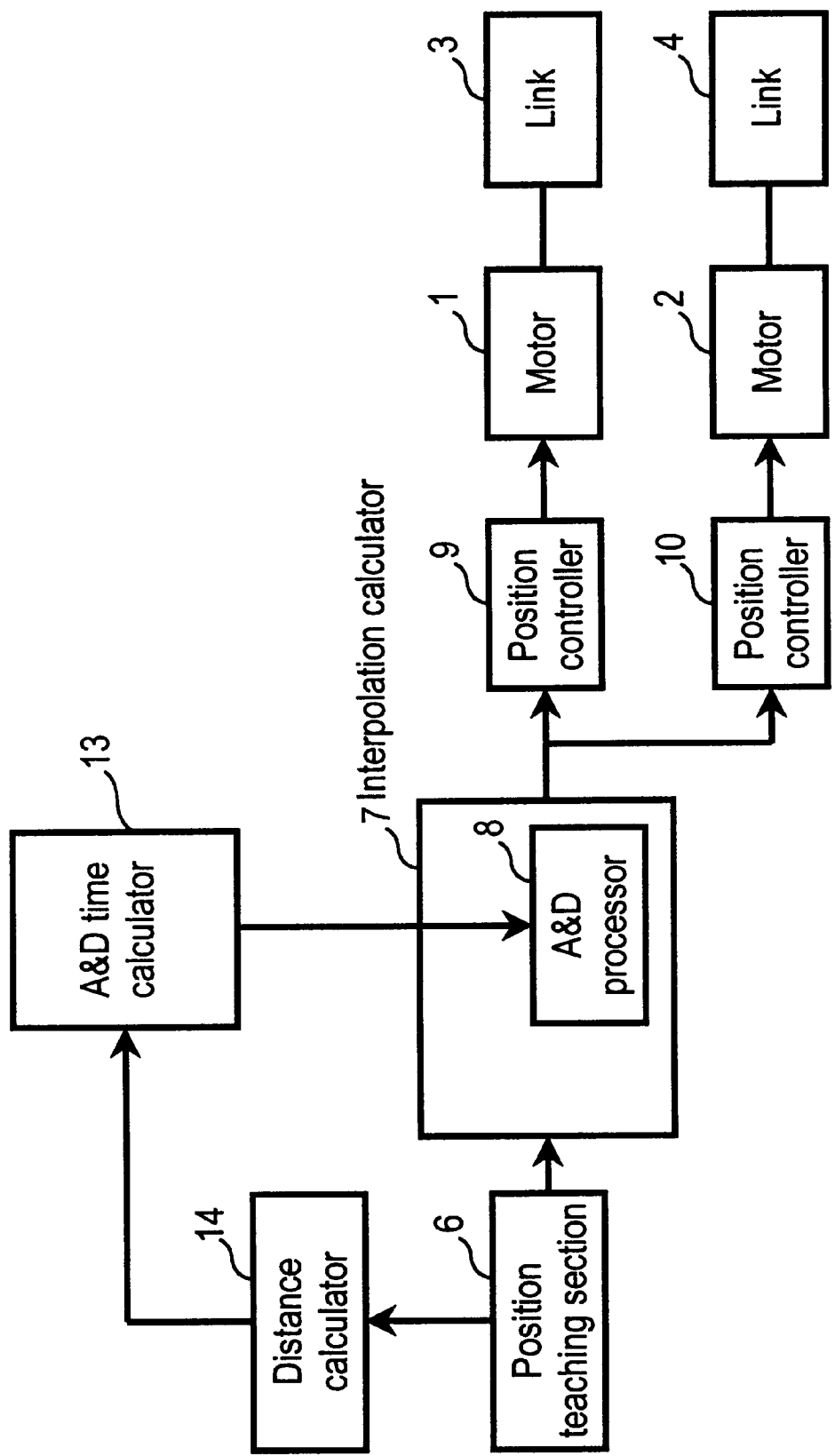
FIG. 2 is a block diagram depicting a structure of an essential part of the controller used in a second exemplary embodiment.

FIG. 2 is a block diagram depicting a structure of an essential part of the controller used in the second exemplary embodiment. In FIG. 2, elements same as those in FIG. 1 are designated with the same numbers. A position teaching section 6 in FIG. 2 outputs position move data of a robot arm tip. The position move data supplied from the position teaching section 6 are divided into move data for each sample period by an interpolation calculator 7. A distance calculator 14 calculates distances between respective motors and the arm tip based on the position move data gained from the position teaching section 6. An acceleration and deceleration (A & D) time calculator 13b calculates an A & D time by using the distance gained in the calculator 13b, meanwhile the A & D time is obtained as a function of the distance between the motor and the arm tip. Move data subjected to the A & D processor 8 is produced by using the move data divided into each sample period in the interpolation calculator 7 and an A & D time calculated in the A & D calculator 13b. The move data subjected to the A & D processor is sent to positioning controllers 9 and 10. The controller 9 calculates a positioning control command of a motor 1, thereby controlling the motor 1. The controller 10 calculates a positioning control command of a motor 2, thereby controlling the motor 2.

Equations for figuring out the A & D time in the second exemplary embodiment are detailed by referring to FIG. 3. When the robot arm is at the posture shown in FIG. 3(a), each load inertia of the motors 1 and 2 are expressed in $m \cdot L_0^2$ and $m \cdot M_2$ respectively, and both are proportional to the square of the distance between respective motors and the arm tip. According to the equation (3), the A & D time varies approximately in proportion to the load inertia when the load inertia varies responsive to posture changes of the robot arm. When gravity torque, one of disturbances, increases, the A & D time also increases. The A & D time thus can be expressed approximately in the following equation:

$$T=a \cdot L^2+B \cdot L+T_0 \quad (4)$$

where: "a" and "B" are proportional coefficients, "L" is a distance between the motor 1 and the arm tip, and "$T_0$" is a minimum A & D time.

In the second exemplary embodiment, the A & D time is calculated by the calculator 13b based on the equation (4) by using the distance between the motor 1 and the arm tip. The distance is calculated by the distance calculator 14.

Exemplary Embodiment 3

Figure 4:
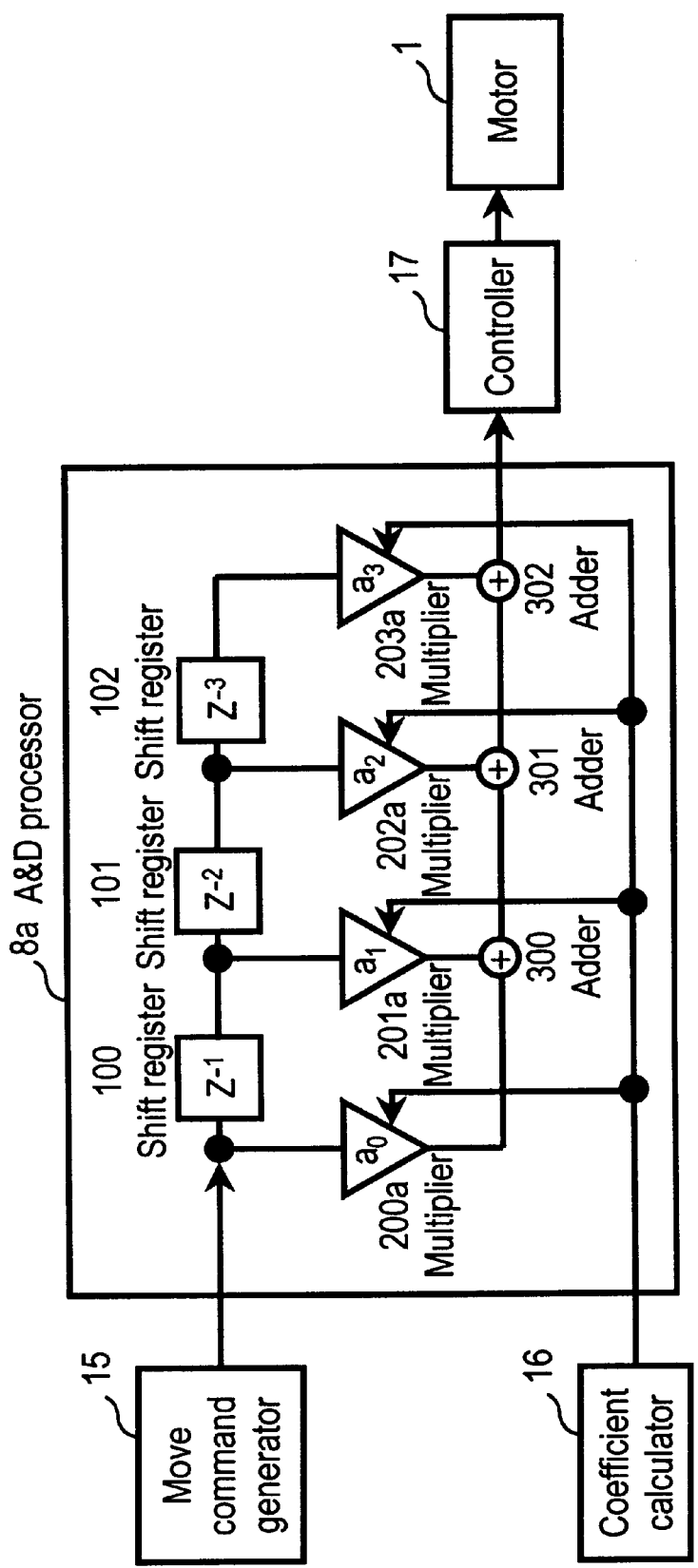
FIG. 4 is a block diagram depicting an example of the acceleration and deceleration (A & D) processor used in the controller of the present invention.

An acceleration and deceleration (A & D) calculator consists of a filter that is detailed by referring to FIG. 4. To make a story simple, an FIR (finite impulse response) filter with four steps is used.

In FIG. 4, a move command generator 15 generates a move command that drives the motor 1. The A & D calculator 8a comprises four-step FIR filter comprising:

(a) three shift registers 100–102 receiving the move command, (b) four multipliers 200a–203a, and (c) three adders 300–302.

The four-step filter has a low pass characteristic.

When this filter is used, an A & D time is determined by a cut-off frequency of this filter. Since this filter comprises the FIR filter, the cut-off frequency is determined by a number of steps of registers 100–102 and coefficients of the multipliers 200–203.

An operation of the A & D in FIG. 4 is described by referring to FIGS. 4 and 5. FIG. 5 depicts a process example. As shown in FIG. 5(*a*), the command generator 15 outputs 100 pulses per sample period to the sample periods t1 through t6, and 60 pulses per sample period to the sample periods t11 through t16.

A coefficient calculator 16 sets all the coefficients $a_0$–$a_3$ of the multipliers 200*a*–203*a* at ¼ so that the filter has four steps during the sample periods t1 through t10. For t11 through t15, the coefficients $a_0$–$a_2$ of the multipliers 200*a*–202*a* are set at ⅓ so that the filter has three steps. The coefficient a3 of the final multiplier 203*a* is set at 0 (zero). Further the coefficients $a_0$ and $a_1$ of the multipliers 200*a* and 201*a* are set at ½ so that the filter has two steps and other coefficients $a_2$ and $a_3$ are set at 0 (zero) during the sample periods t16 through t20. As shown in FIG. 5(*c*), when the coefficients are varied responsive to the sample periods, an output from the A & D processor 8*a* is accelerated and reaches to the move command value (100 pulses) during the sample periods t1 through t4, where all the coefficients $a_0$–$a_3$ of the multipliers 200*a*–203*a* are set at ¼. Then the output is decelerated and reaches to the move command value (0 pulses) during the sample periods t7 through t11. In the period where all the coefficients $a_0$ through $a_2$ of the multipliers 200*a*–202*a* are set at ⅓, the output is accelerated and reaches to the move command value (60 pulses) during the sample period t11–t13. Further, in the period where the coefficients $a_0$ and $a_1$ are set at ½, the output is decelerated and reaches to the move command value (0 pulses) during the sample periods t17 and t18. As such, the coefficient calculator 16 varies the coefficients of the multipliers 200*a*–203*a* within the processor 8*a*, thereby varying the A & D time.

The above operation is further detailed. Since the coefficients $a_0$–$a_3$ of the multipliers 200*a*–202*a* are ¼, a move command value, i.e., 25 pulses (100 is multiplied by ¼ in the multiplier 200*a*) are supplied during the sample period t1 after running through the adders 300–302. During the sample period t2, since the move command value is shifted by the sift register, the move command value is fed into the multiplier 201 also and multiplied by ¼. The outputs from the multipliers 200*a* and 201*a* are added by the adders 300 through 302, whereby 50 pulses are supplied. In the same manner, during the sample period t3, the output from the multiplier 202*a* is also added, whereby 75 pulses are supplied. During the sample period t4, the output from the multiplier 203*a* is added, and 100 pulses are supplied. As a result, in the sample period t4, 100% output is gained, therefore, the A & D time is found in multiplying one sample period by a number of steps of the shift register (in this case, "4").

For the sample period t7, no input to the multiplier 200*a* results in no output therefrom, and the adder 302 thus outputs 75 pulses. In the same manner, for the sample period t8, no output from the multiplier 201*a* results from no input thereto, and the adder 302 thus outputs 50 pulses. Further in the sample period t9, no input to the multiplier 202*a* results in no output therefrom. In the sample period t10, no input at all to the multipliers 200*a*–203*a* results in no output from the adder 302. Since 0% output is obtained from the sample period t10, a deceleration time is found in multiplying one sample time by a number of steps of the shift register.

For the sample period t11, the move command value (60 pulses), is given to the multiplier 200*a*. Since the coefficients $a_0$–$a_2$ are set at ⅓ for this period, 60 pulses are multiplied by ⅓ in the multiplier 200*a*, and the resulting 20 pulses are supplied therefrom. In this sample period, only the multiplier 200*a* has an output, the adders 300–302 handles this output, i.e., 20 pulses. For the next sample period t12, since the move command value is shifted by the shift register 100, the move command value of 60 pulses is given to the multiplier 201*a*, where 60 pulses is multiplied by the coefficient ⅓ ($a_1$), and resulting 20 pulses are supplied. The outputs from the multipliers 200*a*–201*a* are added by the adders 300–302, then the resulting 60 pulses are tapped off from the multiplier 302. For the sample period t14, the move command value is shifted by the shift registers 100–102, and the value is given to the multiplier 203*a*, of which coefficient $a_3$ is 0 (zero), and the output therefrom thus becomes 0 (zero). As a result, the adder 302 outputs 60 pulses. The A & D time is found in multiplying one sample time by a number of steps of the shift register (in this case, "3").

For the sample period t17, no input to the multiplier 200*a* results in no output therefrom. Since the multiplier 201*a* that is coupled to the adder 302 has a coefficient of ½, the multiplier 201*a* outputs 30 pulses. For the sample period t18, no input to the multiplier 201*a* results in no output from the adder 302. As such a deceleration time is found in multiplying one sample time by a number of steps of the shift registers. The deceleration time in this embodiment is thus obtained through multiplying a number of effective steps (in this case, "2") of the shift register [(coefficients of the multipliers are not "0" (zero)].

The above description proves that an effective number of steps of the FIR(finite impulse response) filter can be varied through changing coefficients of the multipliers. In other words, the cut-off frequency can be varied through changing coefficients of the multipliers. A desirable A & D time can be obtained through feeding an output from the A & D time calculator 13 shown in FIG. 1 and FIG. 2 into the coefficient calculator 16 shown in FIG. 4.

Exemplary Embodiment 4

Figure 6:
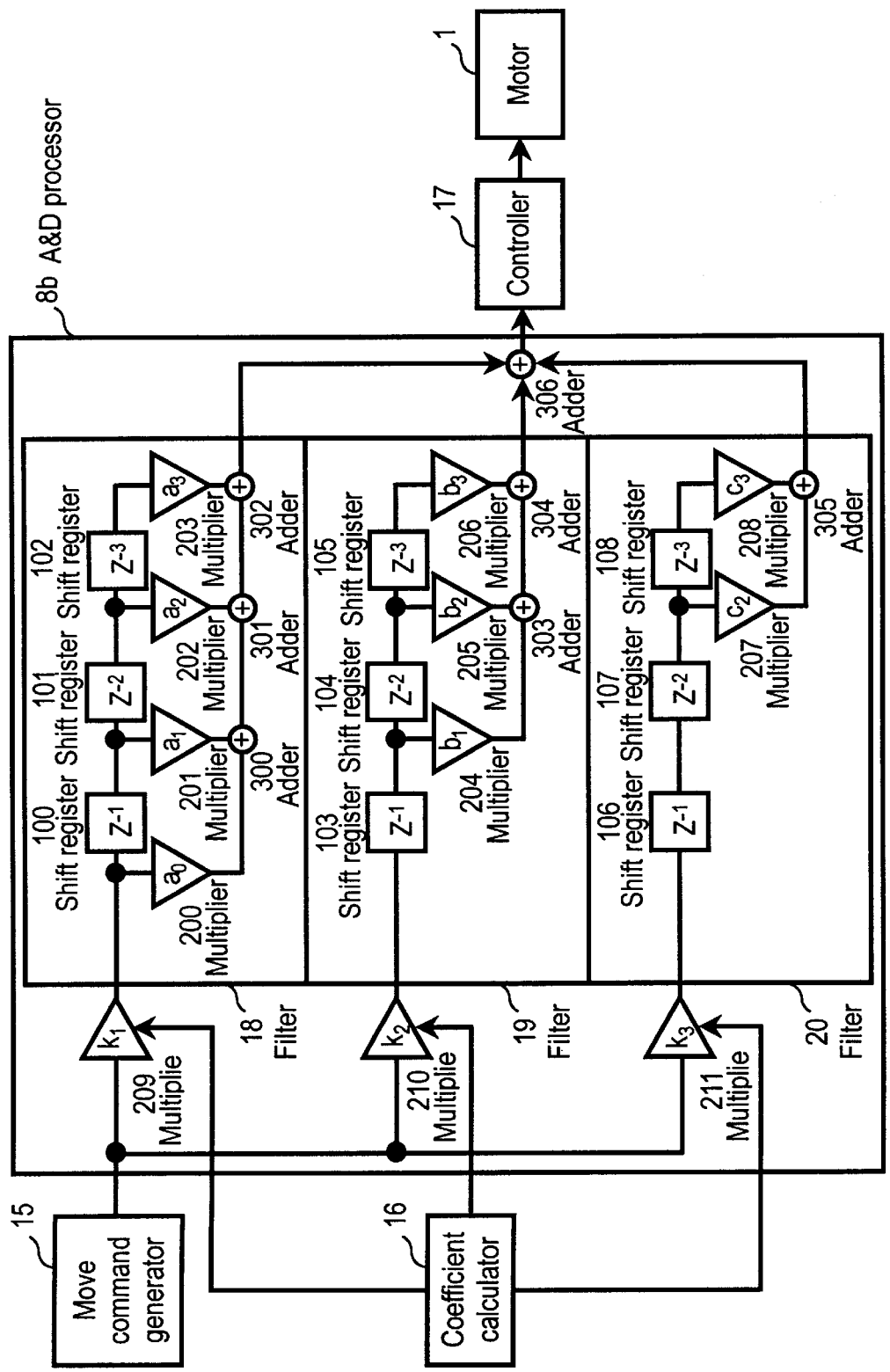
FIG. 6 is a block diagram depicting another example of the A & D processor used in the controller of the present invention.

Another filter, an element of an acceleration and deceleration (A & D) processor, is described by referring to FIG. 6. In this embodiment, elements same as those in FIG. 4 are designated with the same numbers. To make a story simple, three FIR (finite impulse response) filters with four steps are used.

A structure in FIG. 6 is first detailed. In an A & D processor 8*b*, a move command given by a move command generator 15 is multiplied by coefficients $k_1$–$k_3$ of the multiplier 209–211. Each resulting multiplication is fed from the processor 8*b* into filters 18–20. Outputs from the filters 18–20 are added by an adder 306, and then fed into a controller 17, which controls a rotation of a motor 1. The coefficients $k_1$–$k_3$ are set to sum up to "1" so that the input to the processor 8*b* equals the output therefrom. The coefficients $k_1$–$k_3$ are calculated by a coefficient calculator 16. A filter 18 comprises the FIR filter having four steps and a low pass characteristic. The FIR filter 18 comprises the following elements:

(a) three shift registers 100–102, (b) four multipliers 200–203, and (c) three adders 300–302.

The filter 19 comprises the FIR filter having four steps and the low pass characteristic, which comprises shift registers 103–105, multipliers 204–206 and adders 303–304. The filter 20 comprises the FIR filter having four steps and the low pass characteristic, which comprises shift registers 106–108, multipliers 207–208 and adders 305.

Figure 7A:
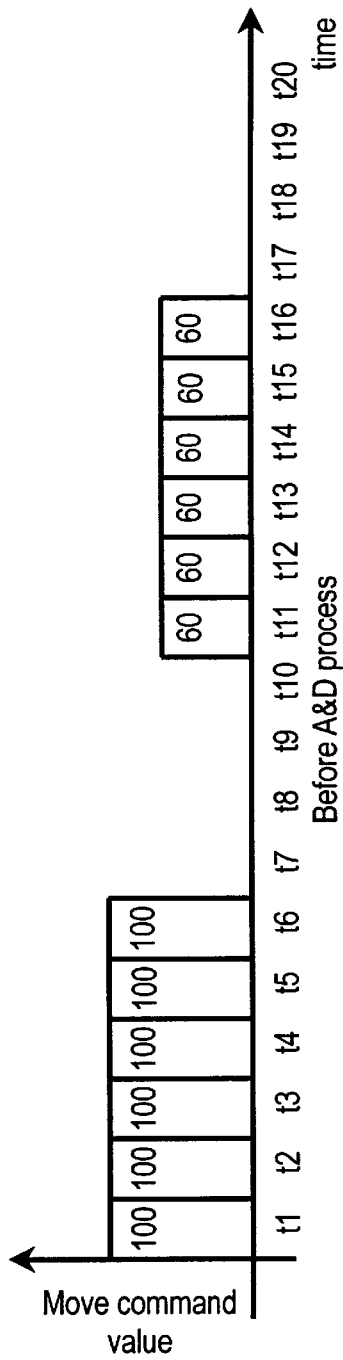
FIG. 7 depicts an operation of the A & D processor in FIG. 6.
Figure 7B:
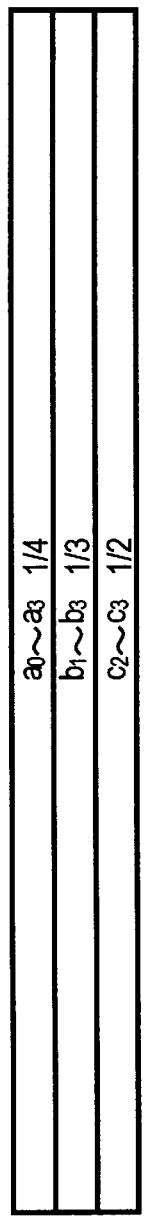

An operation of the A & D processor constructed as above is described hereinafter by referring to FIG. 7, which depicts a process example. As shown in FIG. 7(a), assume a command generator 15 outputs as follows:

For sample periods t1–t6: 100 pulses/sample period
For sample periods t11–t16: 60 pulses/sample period A filter 18 operates as a four-step-filter, and the respective coefficients $a_0$–$a_3$ of the multipliers 200–203 are set at ¼ as shown in FIG. 7(b). A filter 19 operates as a three-step-filter, and the respective coefficients $b_1$–$b_3$ of the multipliers 204–206 are set at ⅓ as shown in FIG. 7(b). A filter 20 operates as a two-step-filter, and the respective coefficients $c_2$–$C_3$ are set at ½ as shown in FIG. 7(b).

Figure 7C:
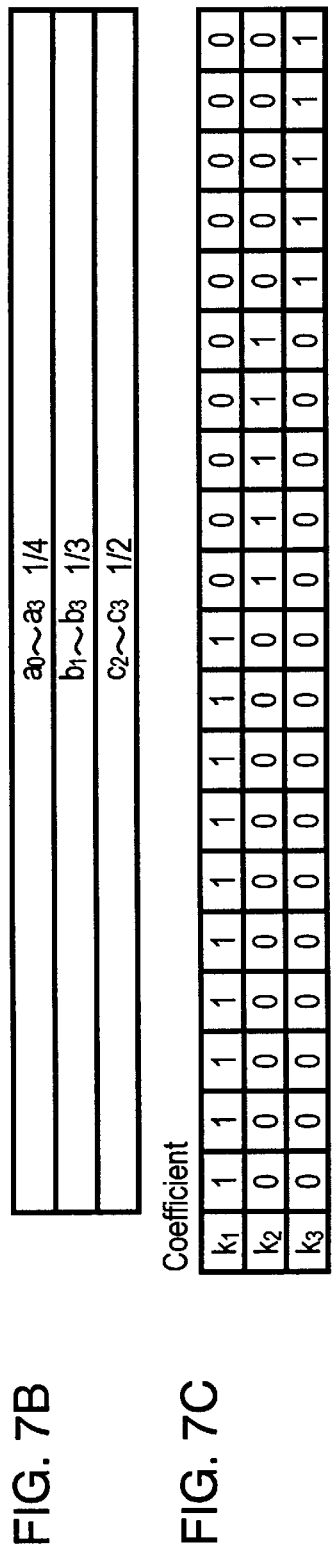

As shown in FIG. 7(c), a coefficient calculator 16 sets only a coefficients $k_1$ of the multiplier 209 at "1" so that the filter 18 is only active for sample periods t1 through t10. In the same manner, only a coefficient $k_2$ of the multiplier 210 is set at "1" so that the filter 19 is only active for sample periods t11 through t15. Further, only $k_3$ of the multiplier 211 is set at "1" so that the filter 20 is only active for sample periods t16 through t20.

Figure 7D:
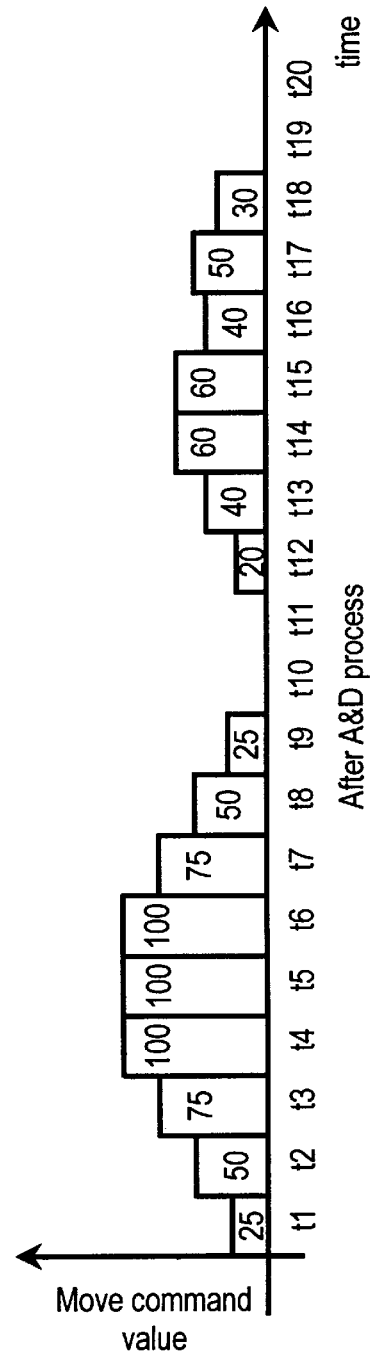

FIG. 7(d) depicts an output status of the A & D processor 8. For the periods where the filter 18 is only active, the output is accelerated during t1–t4 to reach the move command value (100 pulses), and decelerated during t7–t10 to reach the move command (0 pulses). For the periods where the filter 19 is only active, the output is accelerated during t11–t13 to reach the move command (60 pulses). For the periods where the filter 20 is only active, the output is decelerated during t17–t18 to reach the move command (0 pulses). The input pulses during these periods are summed up to 960 pulses, while the output during the same periods sums up to 960 pulses, which agrees with the input total.

Rewriting coefficients of the multipliers, which are elements of the FIR filter, can change the cut-off frequency of the FIR filter, i.e., can change the A & D time. Since this theory was explained in the third exemplary embodiment, the explanation is omitted here.

As such, the coefficients calculator 16 always maintains the sum up of the coefficients $k_1$–$k_3$ at "1", and yet $k_1$, $k_2$ and $k_3$ are varied so that the total input pulses keeps agreeing with the total output pulses, whereby the A & D time can be varied. Accordingly, the A & D process can be done within a desirable A & D time through feeding an output from the A & D time calculator 13 shown in FIG. 1 and FIG. 2 into the coefficient calculator 16 shown in FIG. 4.

Exemplary Embodiment 5

Figure 8:
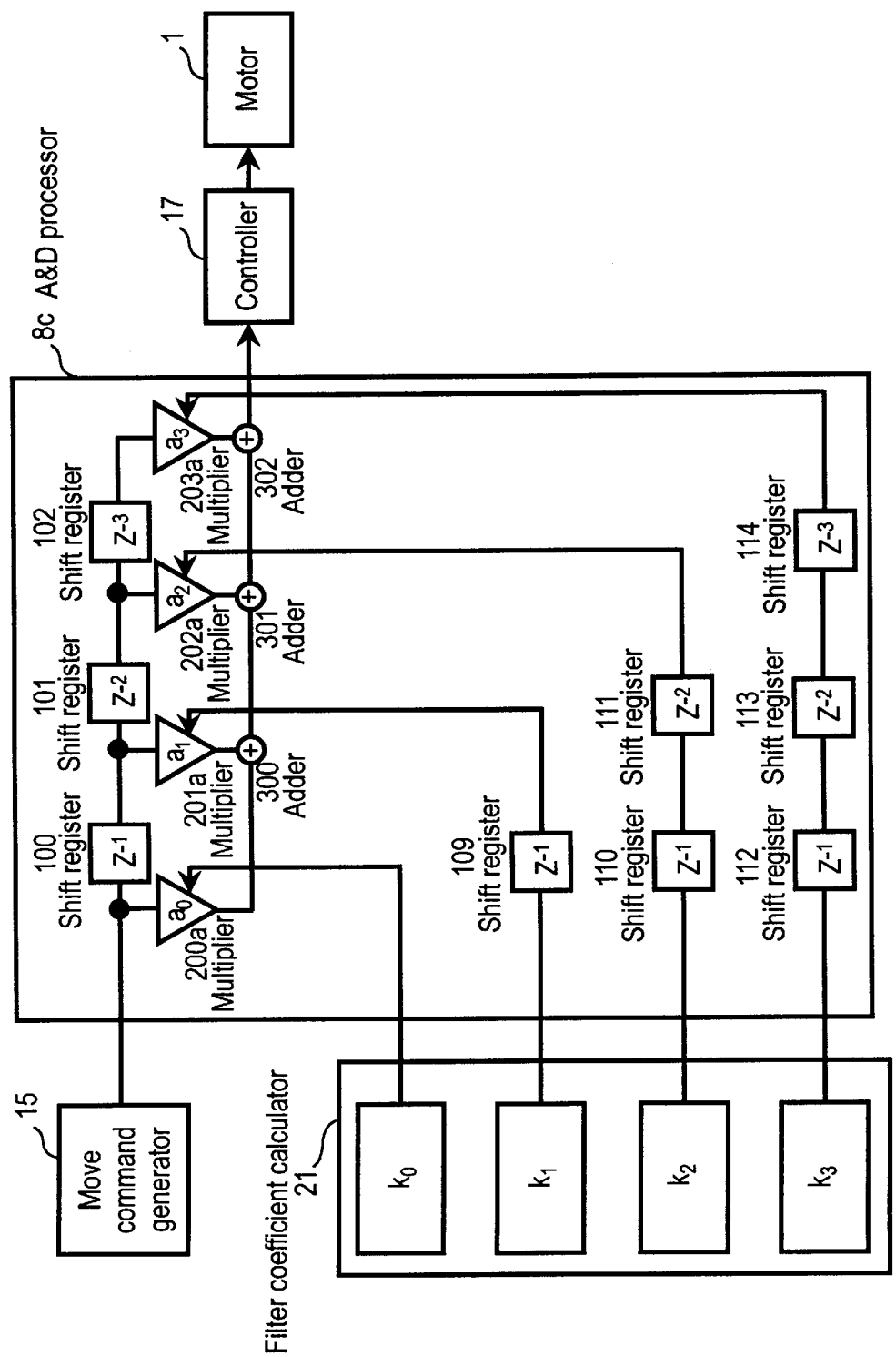
FIG. 8 is a block diagram depicting another example of the A & D processor used in the controller of the present invention.

Another filter, an element of an acceleration and deceleration (A & D) processor 8, is detailed by referring to FIG. 8. In this fifth exemplary embodiment, the elements same as used in FIGS. 4 and 6 are designated with the same numbers, and an FIR (finite impulse response) filter with four steps is used in order to make a story simple.

The A & D processor 8c comprises four-steps-FIR filter having the following elements:

(a) three shift registers 100–102 coupled in series and receiving commands from a move command generator 15, (b) four multipliers 200a–203a, (c) three adders 300–302 that add the outputs of the multipliers 200a–203a (d) a shift register 109 that shifts coefficient $k_1$ supplied from a filter coefficient calculator 21, (e) two shift registers 110 and 111 coupled in series and shift a coefficient $k_2$ supplied from a filter coefficient calculator 21, and (f) three shift registers 112–114 coupled in series and shift a coefficient $k_3$ supplied from the filter coefficient calculator 21.

The multiplier 200a is coupled to an input side of the shift register 100, and a coefficient $a_0$ thereof, which is multiplied by an input command value, is determined by a coefficient $k_0$ tapped off from the filter coefficient multiplier 21. The multiplier 201a is coupled to an output side of the shift register 100, and a coefficient $a_1$ thereof is determined by a coefficient $k_1$ tapped off from the calculator 21 and shifted by the shift register 109. The multiplier 202a is coupled to an output side of the shift register 101, and a coefficient $a_2$ thereof is determined by a coefficient $k_2$ tapped off from the calculator 21 and shifted by the two shift registers 110 and 111. The multiplier 203a is coupled to an output side of the shift register 102, and a coefficient $a_3$ is determined by a coefficient $k_3$ tapped off from the calculator 21 and shifted by three shift registers 112–114. An output supplied from the A & D processor 8c is given to a controller 17, which controls a motor 1.

A processing operation of the A & D processor that is constructed as above is described by referring to FIGS. 8 and 9. FIG. 9 depicts a process example. As shown in FIG. 9(a), assume a command generator 15 outputs as follows:

For sample periods t1–t6: 100 pulses/sample period
For sample periods t11–t16: 60 pulses/sample period During the sample periods t1–t10, the filter coefficient calculator 21 sets each coefficient $k_0$–$k_3$ at ¼ as shown in FIG. 9(b), so that the A & D processor comprises four-step-FIR filter. During the sample periods t11–t15, the filter coefficient calculator 21 sets each coefficient $k_0$–$k_3$ at ⅓, so that the A & D processor comprises three-step-FIR filter. During the sample periods t16–t20, the filter coefficient calculator 21 sets each coefficient $k_0$–$k_3$ at ½ as shown in FIG. 9(b), so that the A & D processor comprises two-step-FIR filter. The move command value supplied from the generator 15 shifts the registers 100–102, at the same time, respective coefficients $k_1$–$k_3$ are shifted through synchronizing with this shift of the registers 100–102, i.e., $k_1$ is shifted by the shift register 109, $k_2$ is shifted by the two registers, 110 and 111, and $k_3$ is shifted by the three registers 112–114. These shifts of $k_0$–$k_3$ rewrite the coefficients $a_0$–$a_3$ of the multipliers 200a–203a as shown in FIG. 9(c). Accordingly, the move command value is processed by the coefficients $a_0$–$a_3$ as shown in FIG. 9(c) during each sample period, and added by the adder 300–302 before being tapped off. The move command values that are added by the adder 300–302 and tapped off are shown in FIG. 9(d). For the periods where $k_0$–$k_3$ are all set at ¼, the output is accelerated during t1–t4 to reach the move command value (100 pulses), and decelerated during t7–t10 to reach the move command (0 pulses). For the periods where $k_0$–$k_3$ are all set at ⅓, the output is accelerated during t11–t13 to reach the move command (60 pulses). For the periods where $k_0$–$k_3$ are all set at ½, the output is decelerated during t17–t18 to reach the move command (0 pulses). The input pulses during these periods sum up to 960 pulses, while the output during the same periods sums up to 960 pulses, which agrees with the input total.

Rewriting coefficients of the multipliers, which are elements of the FIR filter, can change the cut-off frequency of the FIR filter, i.e., can change the A & D time. Since this theory was explained in the third exemplary embodiment, the explanation is omitted here.

As such, the coefficients calculator 21 always maintains the sum up of the filter coefficients at "1", and yet $k_1$, $k_2$ and $k_3$ are shifted so that the total input pulses keeps agreeing with the total output pulses, whereby the A & D time can be varied. Accordingly, the A & D process can be done within a desirable A & D time through feeding an output from the A & D time calculator 13 as shown in FIG. 1 and FIG. 2 into the coefficient calculator 21 as shown in FIG. 8.

Exemplary Embodiment 6

When a move command value over a prescribed value is given, how does a controller process the move command? This is the subject of this embodiment. Move speeds of robot arms are restricted within an upper limit because strength of elements including links and motors should be taken into account, and safety operations of robots should be always kept in mind. When teaching an action to a robot, a teaching section cannot teach a move speed over the prescribed speed. However, a move command value happens to exceed a prescribed value in an instant by a some move speed and a method of changing the speed depending on a posture of the robot arm. This embodiment details a controller that can prevent a move command value over a prescribed value from being given to an acceleration and deceleration (A & D) processor.

Figure 10:
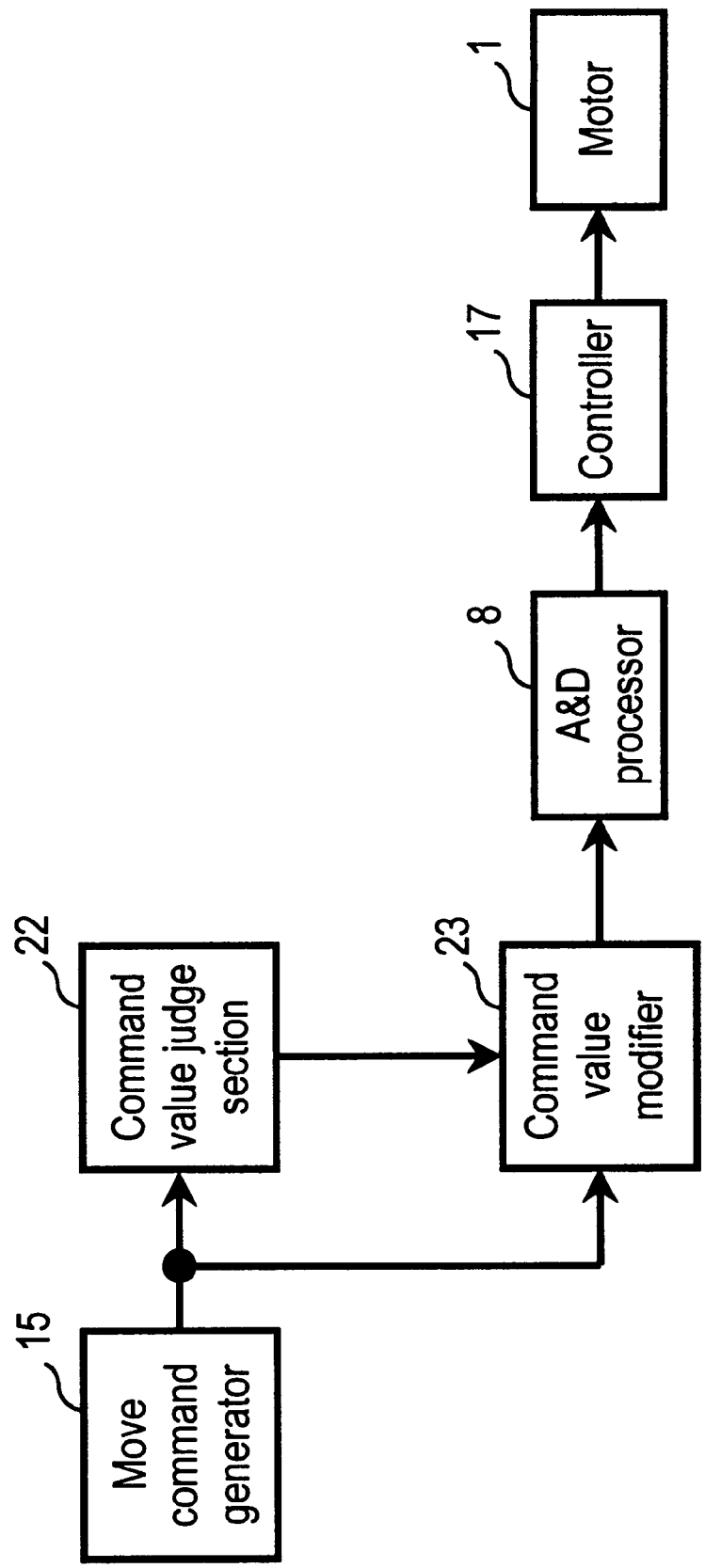
FIG. 10 is a block diagram depicting a controller of the present invention that processes an input move command exceeding an upper limit.

FIG. 10 depicts a structure of a controller, which processes a move command value over a prescribed value. The elements same as those used in Exemplary Embodiments 1–5 are designated with the same numbers.

The controller depicted in FIG. 10 is detailed hereinafter. A move command generator 15 generates a move command that controls a motor 1. A command value judge section 22 compares the move command value with a prescribed value. When the move command value included in one sample period is within the prescribed value, a command value modifier 23 does not do anything, and the move command value is subjected to the A & D processor 8. When the command-value-judge-section 22 determines that the move command value included in one sample period exceeds the prescribed value, the command value is split together with one sample period in two, and sent to the A & D processor 8 by the command value modifier 23 so that the move command value included in one sample period does not exceed the prescribed value. If this split does not allow the move command value in a sample period to be less than the prescribed value, another split is executed. The controller 17 controls the motor 1 according to a move command value undergone the A & D processing.

Figures 11A, 11B:
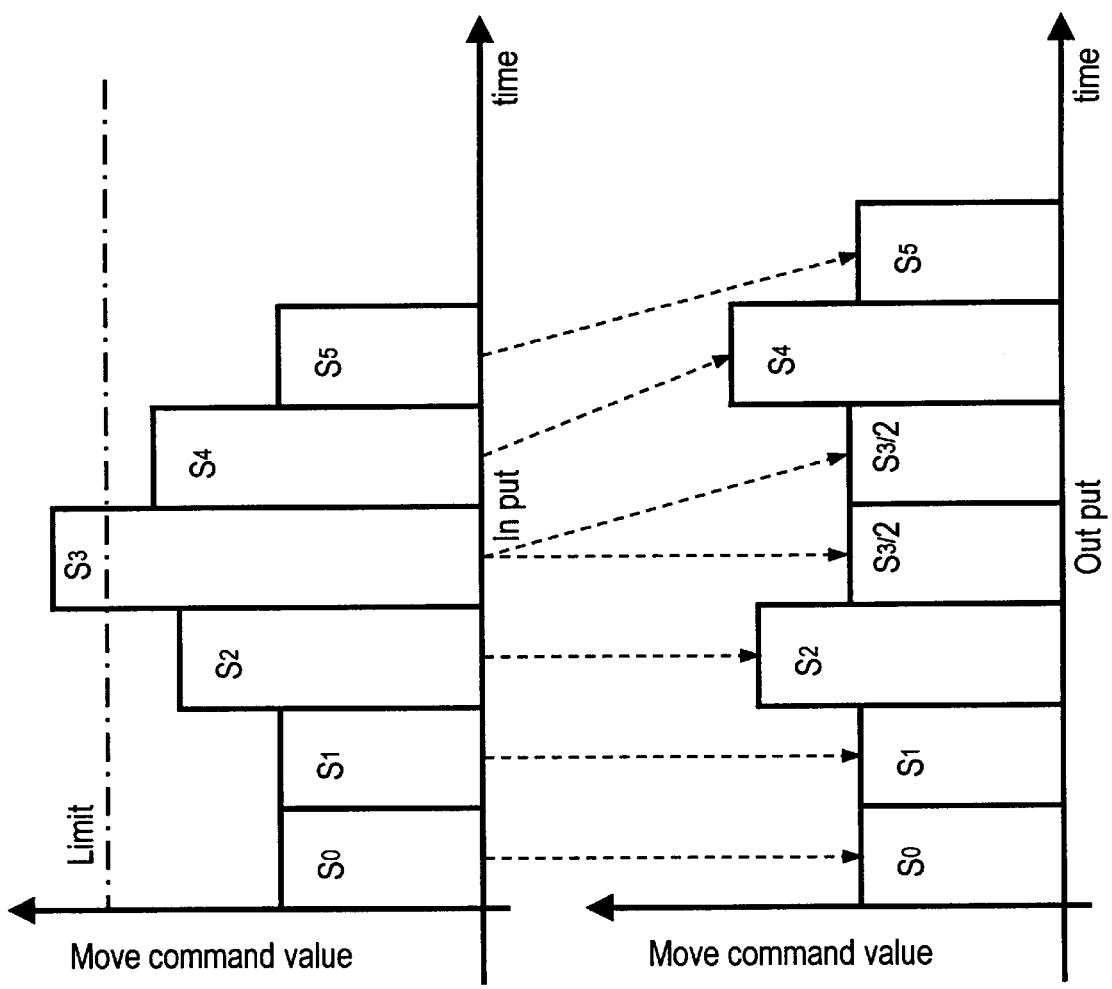
FIG. 11 depicts a processing operation of the move command described in FIG. 10.

An operation in the command value modifier 23 is detailed by referring to FIG. 11. FIG. 11(a) depicts a status before the move commands undergo the modifying process, and $S_0$–$S_5$ are respective move command values in each sample period. Since $S_0$, $S_1$, $S_2$, $S_4$ and $S_5$ are within a prescribed value, no process is applied by the modifier 23, and these command values are sent to the A & D processor 8 as they are. The move command value $S_3$, however, exceeds the prescribed value, and is thus split into two $S_3/2$ by the modifier 23, and these two equivalent values are sent successively into the A & D processor 8, which are shown in FIG. 11(b). In this process, the move command values are given to the processor 8 without changing time spans of the sample periods except the exceeding move command value that is divided into two (or more) sample periods.

As such, the exceeding move command value is divided into a plurality of sample periods, thereby eliminating shocks applied to robot arms during operations. As a result, excess load to the elements of robot arms including links and motors can be eliminated.

Exemplary Embodiment 7

In this embodiment, a difference of move command values of adjacent two sample periods is discussed. When this difference is over a prescribed value, how does a controller process the move command value? This is the subject of this embodiment. When a teaching is given to a robot arm so that an operation direction is sharply changed, the difference over the prescribed value can be produced at local. An excessive difference prevents a smooth A & D (acceleration and deceleration) process, and also applies excessive loads to the elements of the robot arm. The controller used in this embodiment thus aims to prevent a difference exceeding a prescribed value and produced in an instance from entering into the A & D processor.

Figure 12:
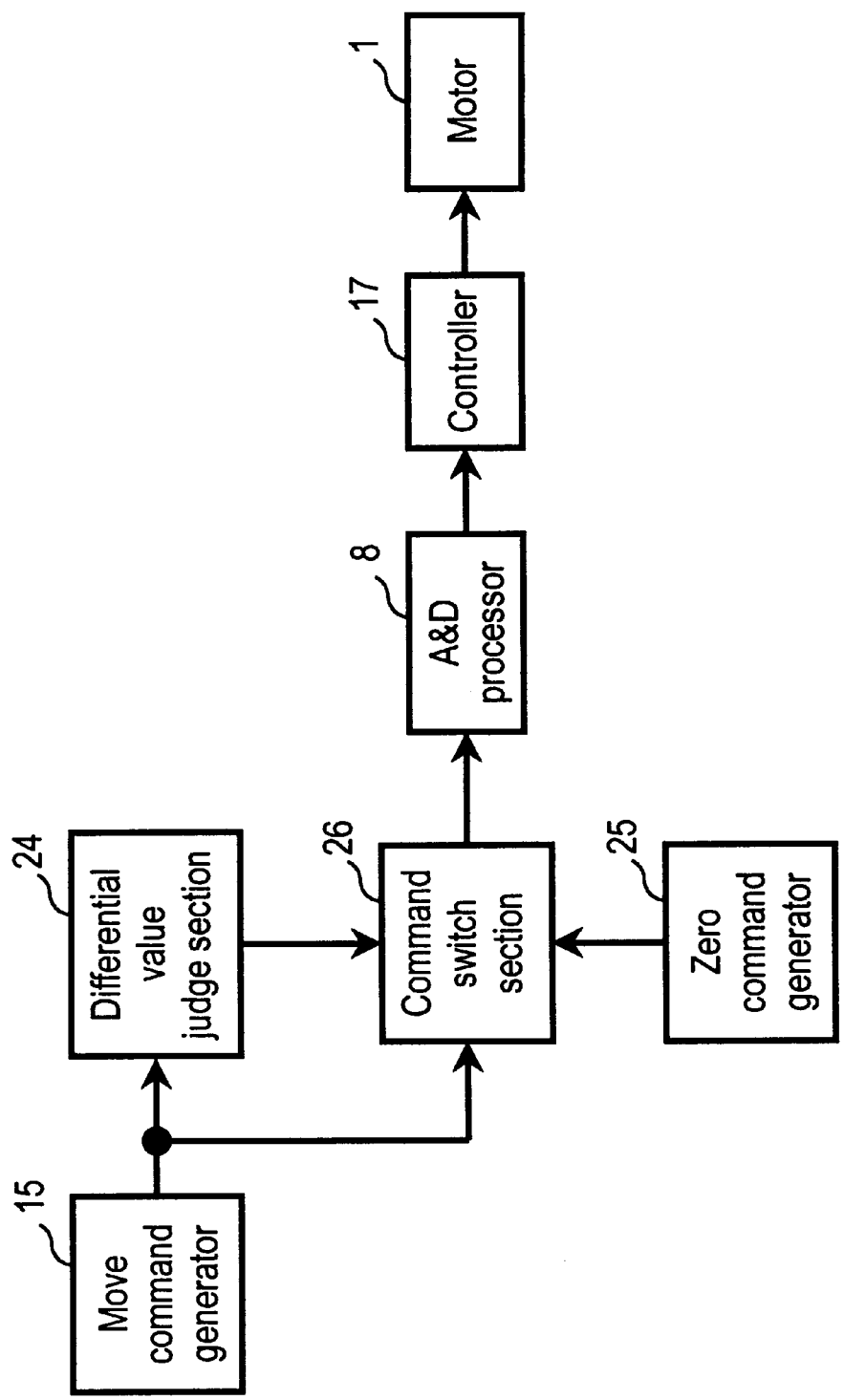
FIG. 12 is a block diagram depicting a structure of the controller that performs a process of a differential value of the move command.

FIG. 12 depicts the structure of the controller that processes a move command value having an exceeding difference over a prescribed value. The elements same as those used in Exemplary Embodiments 1–6 are designated with the same numbers, and an FIR (finite impulse response) filter with two steps is used in an A & D processor 8 in order to make a story simple.

A differential value judge section 24 judges the difference included in the move command value supplied from a move command generator 15 whether the difference is within a prescribed value or not. When the difference is within the prescribed value, the move command value is directly sent to the A & D processor bypassing a command switch section 26. When the difference is judged to exceed the prescribed value, a zero command generator 25 outputs a zero command for necessary sample periods to the command switch section 26, which sends the zero command instead of the move command value to the A & D processor 8. A controller 17 controls a motor 1 based on the move command value undergone the A & D processor 8.

Figures 13A, 13B:
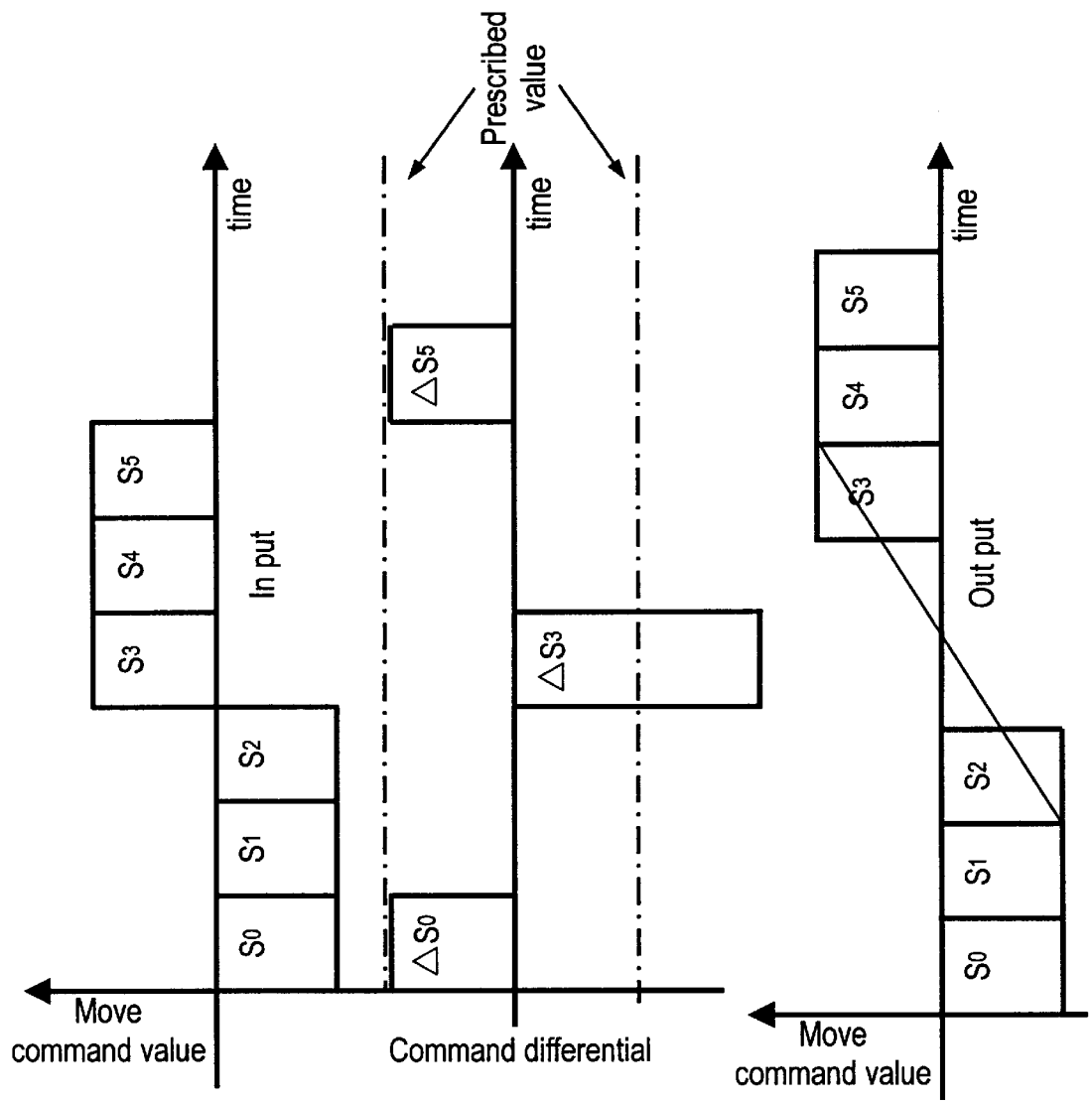
FIG. 13 depicts an operation of the controller in FIG. 12.

A process in this command switch section 26 is detailed by referring to FIG. 13. Move command values $S_0$–$S_5$ are assigned to each sample period. Respective differences between adjacent sample periods in $S_0$–$S_2$ are within the prescribed value and those of $S_3$–$S_5$ are also within the prescribed value. When the move command value $S_0$ is supplied, the difference is $\Delta S_0$, and when a move command 0 (zero) is given to the sample period next to the move command $S_5$, the difference is $\Delta S_5$. Both these differences are within the prescribed value. On the other hand, a difference between $S_2$ and $S_3$ is $\Delta S_3$ of which absolute value is a total of absolute values of $S_2$ and $S_3$. This total value exceeds substantially the prescribed value. At this time, after outputting the move command value $S_2$, the command switch section 26 allows the zero command generator 25 to output zero commands to the A & D processor 8 during the sample periods responding to a number of steps of the FIR (finite impulse response) filter. As mentioned previously, this embodiment uses the two-step-filter, the zero commands are supplied during two sample periods as shown in FIG. 13.

A number of sample periods where the zero command is supplied agree with a number of steps of the FIR filter, whereby the move command value $S_3$ is given to the A & D processor 8 after the value $S_2$ underwent the deceleration process. As a result, the normal A & D process is always performed, which assures a smooth A & D operation.

Exemplary Embodiment 8

Figure 14:
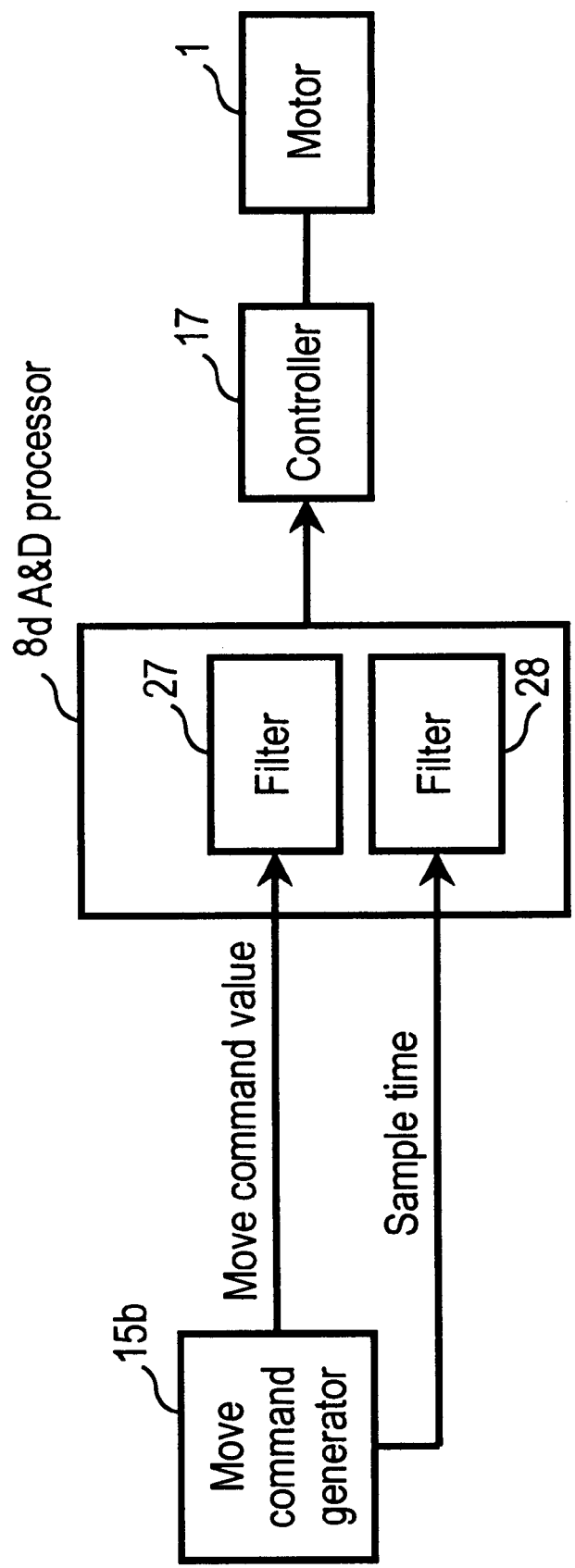
FIG. 14 is a block diagram depicting a structure of the controller that performs an A & D process of move command values when respective sample times are different.

The exemplary embodiments 3–7 described the present invention under the condition that each sample period has the same time span. This embodiment, on the other hand, describes an invention about an acceleration and deceleration (A & D) process handling move command values having different time spans. FIG. 14 depicts a structure of a controller that processes A & D for move command values having various time spans of sample periods. The elements same as those used in Exemplary Embodiments 1–7 are designated with the same numbers, and an FIR (finite impulse response) filter with two steps is used in an A & D processor 8d in order to make a story simple.

In FIG. 14, a move command generator 15b calculates a move command value for one sample period, and at the same time, calculates a sample time for each sample period. This move command value and sample time undergo filtering processes in FIR filters 27 and 28 in the A & D processor 8d, both having the same low pass characteristic. A move speed is figured out from the move command and sample time, and a controller 17 controls a motor 1 based on the move speed.

Figure 15A:
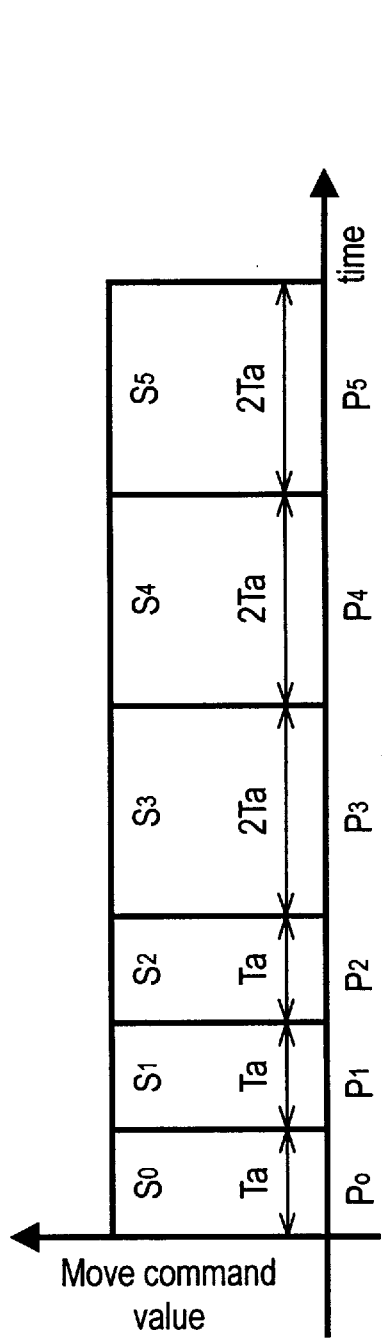
FIG. 15 depicts an operation of the controller in FIG. 14.
Figure 15B:
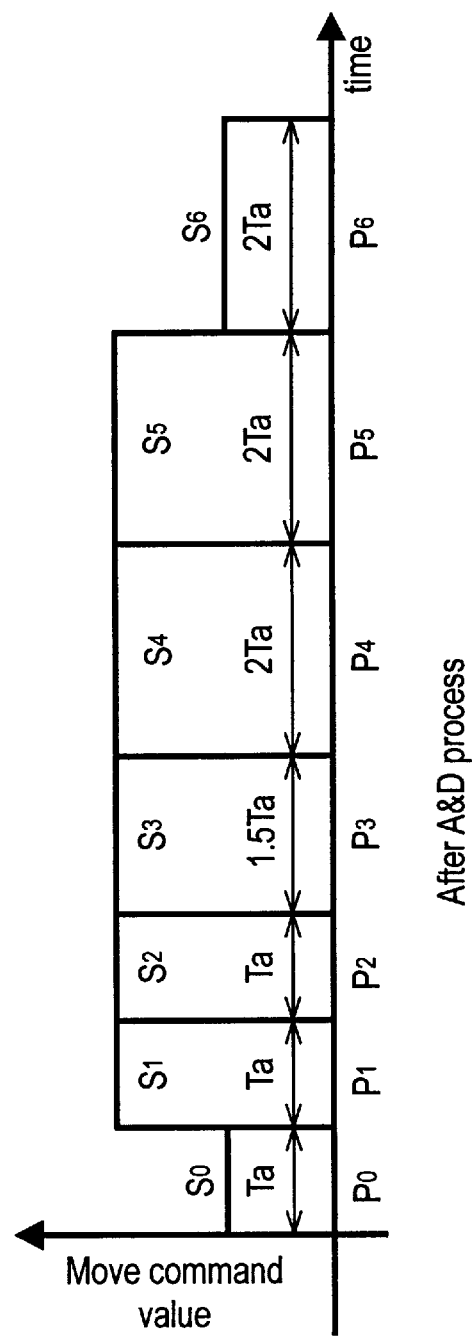
Figure 16:
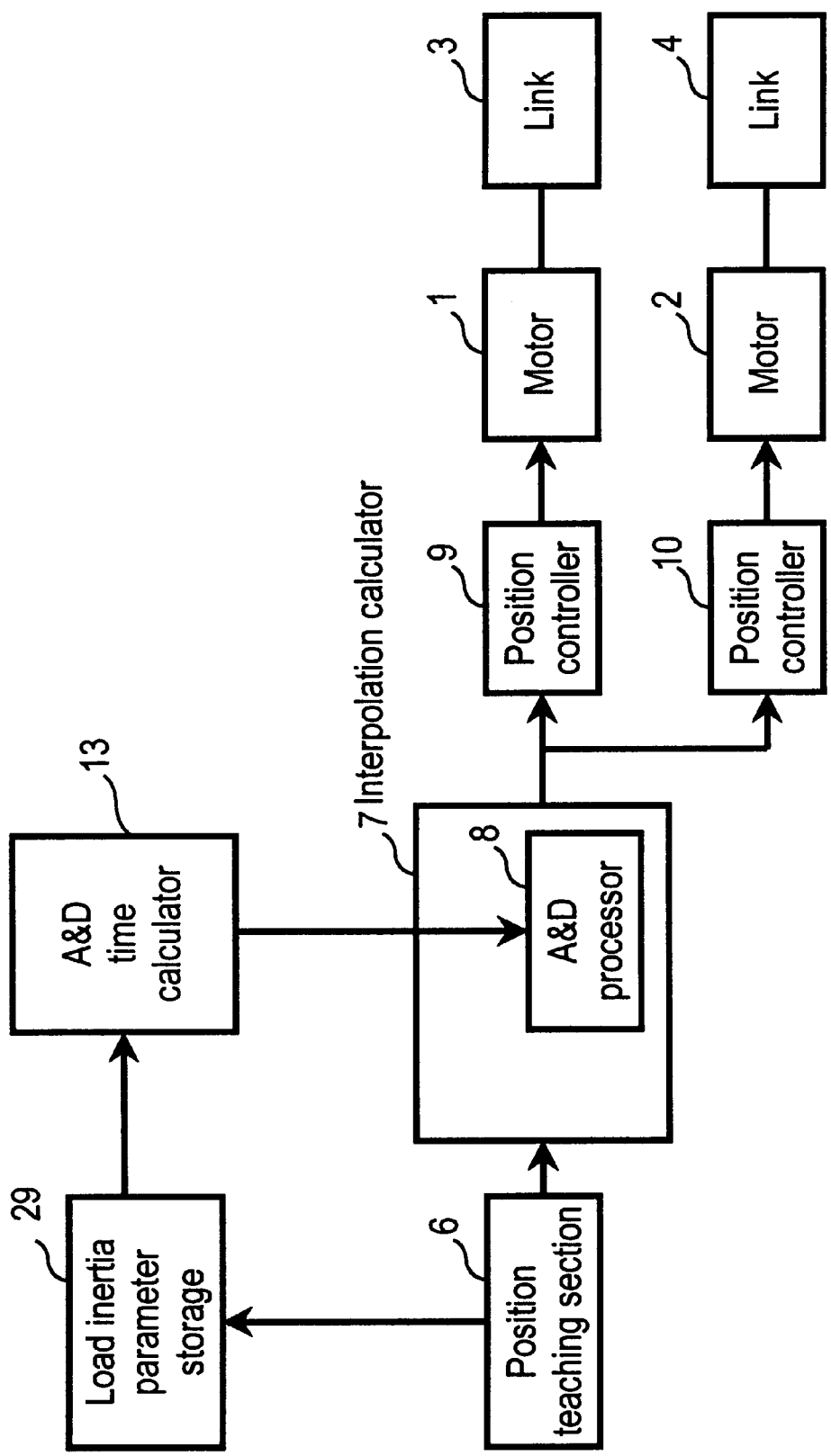
FIG. 16 is a block diagram depicting a structure of an essential part of a conventional controller.
Figure 17:
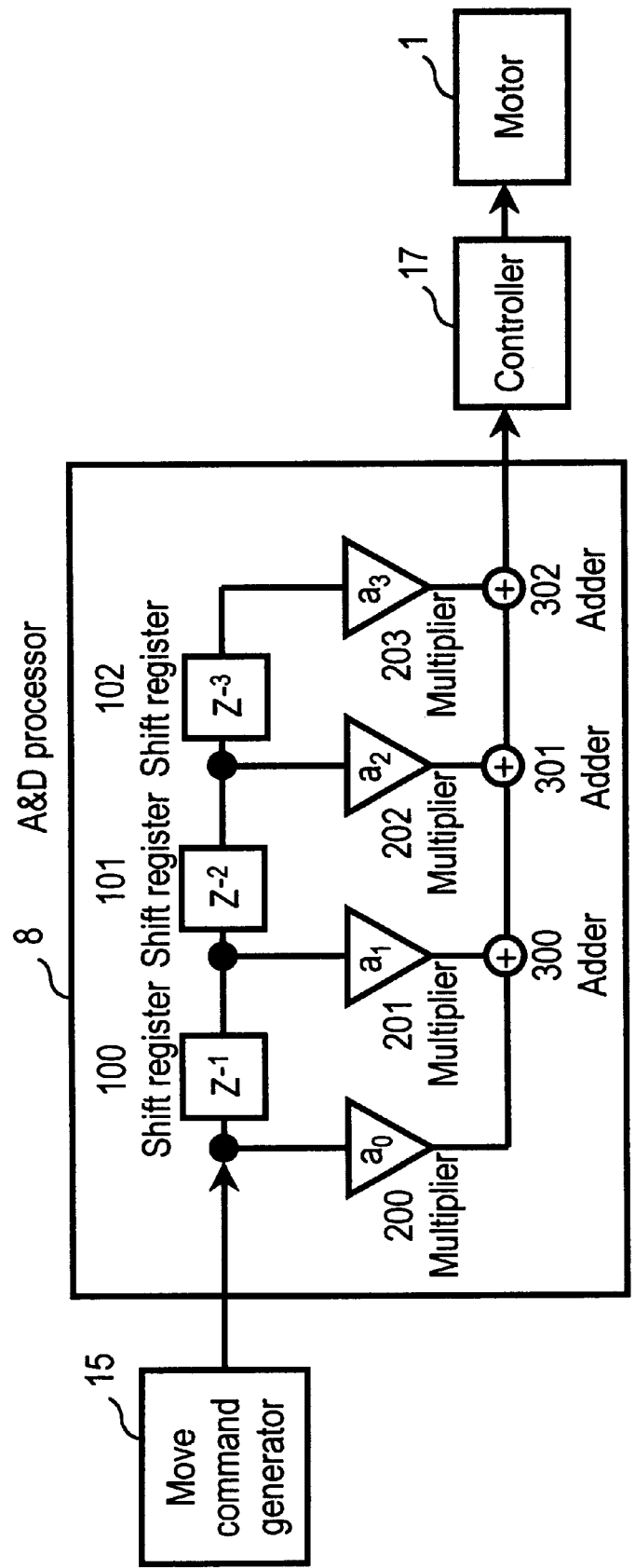
FIG. 17 is a circuit diagram depicting an A & D processor used in the conventional controller.
Figure 18A:
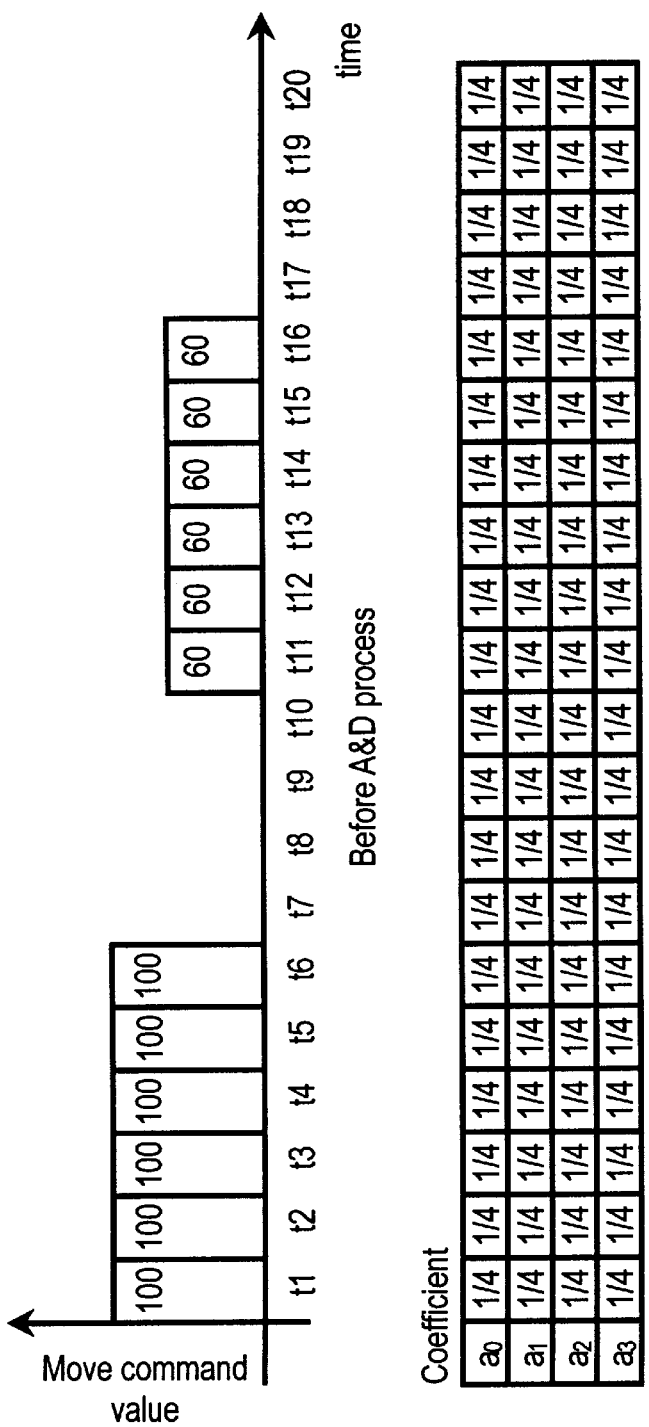
FIG. 18 depicts an operation of the A & D processor of the conventional controller.
Figure 18B:
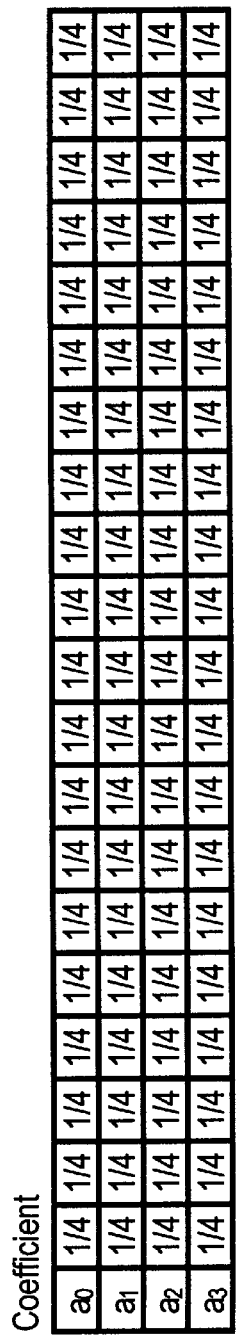
Figure 18C:
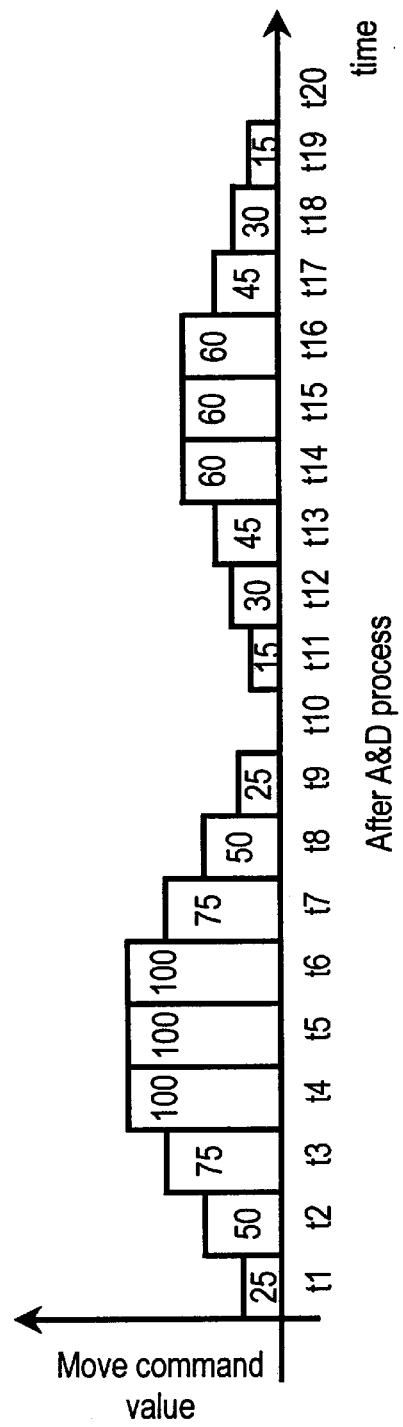

FIG. 15 further details the operation. Move command values $S_0$–$S_5$ are assigned to each sample period. Sizes of these move command values, i.e., numbers of pulses, are the same in each sample period; however, sample times are not the same such as they are "Ta" for $S_0$–$S_2$, and "2Ta" for $S_3$–$S_5$. This means that a speed of the sample periods $P_0$–$P_2$ where the move command values $S_0$–$S_2$ are assigned is twice as much as that of the sample periods $P_3$–$P_5$ where $S_3$–$S_5$ are assigned. If only a move command value undergoes the filtering process in the FIR filter 27 having the low pass characteristic, a number of pulses of the move command value does not change between the sample periods $P_2$ and $P_3$. The A & D process thus are not provided yet. Another FIR filter 28 having the same low pass characteristic performs a filtering process on sample times in order to solve this problem. Since the sample times are different in the sample periods $P_2$ and $P_3$, the sample times are processed step by step with the low pass FIR filter, and the sample time of the P3 is changed from "2Ta" to "1.5Ta". Therefore, the speed at P3 becomes an intermediate value between $P_2$ and $P_4$, which proves a deceleration process has been performed. Meanwhile, the A & D processes provided in $P_0$ and $P_6$ are normal processes due to a difference produced between move command values.

As such, even the sample times differ in each sample period, not only the move command values but also the sample times are undergone the filtering process, whereby the smooth A & D process can be realized.

What is claimed is:

1. A controller comprising:
   an interpolation calculator operable to divide move data of a robot arm tip position into each sample period, the data supplied from a position teaching section;
   a load inertia calculator operable to calculate load inertia;
   a gravity torque calculator for calculating gravity torque;
   acceleration and deceleration (A & D) time calculator operable to calculate an optimum A & D time by using the load inertia calculated by said load inertia calculator and the gravity torque calculated by said gravity torque calculator;
   an A & D processor operable to provide an A & D process to move data of each sample time calculated by said interpolation calculator based on the A & D time calculated by said A & D time calculator; and
   a plurality of position controllers operable to control each motor based on the move data processed by said A & D processor.

2. A controller comprising:
   an interpolation calculator operable to divide move data of a robot arm tip position into each sampled period, the data supplied from a position teaching section;
   a distance calculator operable to calculate a straight line distance between a motor and the robot arm tip, and a horizontal component of the distance; and
   an acceleration and deceleration (A & D) time calculator operable to calculate load inertia as a function of the straight line distance between the motor and the robot arm tip as well as gravity torque as a function of a horizontal component of the straight line distance, thereby calculating an optimum A & D time.

3. A controller comprising:
   an acceleration and deceleration (A & D) processor operable to vary an A & D time through varying a cut-off frequency of a filter;
   a move command generator;
   a coefficient calculator operable to calculate a coefficient that accelerates and decelerates a motor, a total of the coefficients is "1" (one); and
   a controller operable to control a motor based on an output from an adder;
   wherein said A & D processor comprises the following elements:
      an FIR (finite impulse response) filter having N steps (N=natural number including 2 and over), wherein said FIR filter comprises the following elements:
      N−1 pieces of shift registers coupled in series and operable to shift a move command tapped off from said move command generator;
      N pieces of multipliers operable to multiply an input move command value and move command values stored in each shift register by the coefficients calculated by said coefficient calculator respectively; and
      N−1 pieces of said adders operable to add outputs from said multipliers.

4. A controller as claimed in claim 3, further comprising:
   a command value judge section operable to judge whether a move command generated by the move command generator exceeds a prescribed value; and
   a command value modifier operable to multiply said move command value by ½n (n=natural numbers including 1 and over) when said move command value exceeds the prescribed value, and feeding the resulting multiplied value into said A & D processor.

5. A controller as claimed in claim 3, further comprising:
   a differential value judge section operable to judge a difference between adjacent sample periods when the move command values generated from the move command generator vary in adjacent sample periods;
   a zero command generator operable to generate a zero command; and
   a command switch section operable to switching the move command to the zero command and outputs the zero command into the A & D processor when the difference exceeds a prescribed value, said command switch section successively outputs the zero commands for N sample periods when FIR filter of the A & D processor has N steps.

6. A controller as claimed in claim 3, wherein said move command generator outputs a time span of each sample period together with a move command value per sample period, and wherein said A & D processor comprises:
   a FIR filter providing a filtering process to the move command; and
   another FIR filter providing a filtering process to the sample time span.

7. A controller comprising:
   an acceleration and deceleration (A & D) processor operable to vary an A & D time through varying a cut-off frequency of a filter;
   a move command generator operable to generate a move command that drives the motor;

a coefficient calculator operable to calculate a coefficient that performs accelerates and decelerates the motor;

an A & D processor comprising the following elements:
- N pieces of multipliers operable to multiply the move command by coefficients, the coefficients sum up to "1" (one);
- N pieces of FIR (finite impulse response) filters; and
- N pieces of adders operable to add outputs from said FIR filters; and a controller operable to control the motor based on outputs from said adders.

8. A controller as claimed in claim 7, further comprising:

a command value judge section operable to judge whether a move command generated by said move command generator exceeds a prescribed value; and a command value modifier operable to multiply said move command value by $\frac{1}{2}n$ (n=natural numbers including 1 and over) when said move command value exceeds the prescribed value, and feeding the resulting multiplied value into said A & D processor.

9. A controller as claimed in claim 7, further comprising:

a differential value judge section operable to judge a difference between adjacent sample periods when the move command values generated from the move command generator vary in adjacent sample periods;

a zero command generator operable to generate a zero command; and a command switch section operable to switch the move command to the zero command and outputs the zero command into said A & D processor when the difference exceeds a prescribed value, said command switch section successively outputs the zero commands for N sample periods when said FIR filter of said A & D processor has N steps.

10. A controller as claimed in claim 7, wherein said move command generator outputs a time span of each sample period together with a move command value per sample period, and wherein said A & D processor comprises:

a FIR filter providing a filtering process to the move command; and another FIR filter providing a filtering process to the sample time span.

11. A controller comprising:

an acceleration and deceleration (A & D) processor operable to vary an A & D time through varying a cut-off frequency of a filter;

move command generator operable to generate a move command that drives the motor;

a coefficient calculator operable to calculate a coefficient that accelerates and decelerates a motor, a total of the coefficients is "1" (one);

an A & D processor comprising N steps of FIR (finite impulse response) filter (N=natural numbers including 2 and over), wherein said FIR filter comprises the following elements:
- N−1 pieces of shift registers coupled in series operable to shift move commands tapped off from said move command generator;
- N pieces of multipliers operable to multiply input move command values from said move command generator and move command values stored in each shift register respectively by coefficients calculated in said filter coefficients calculator;
- N−1 pieces of adders operable to add outputs from said multipliers; and
- a coefficients shift register operable to shift a coefficient from said filter coefficient calculator in synchronizing with a shift of said shift register, thereby rewriting a coefficient of said multipliers; and a controller operable to control the motor based on outputs from said adders.

12. A controller as claimed in claim 11, further comprising:

a command value judge section operable to judge whether a move command generated by the move command generator exceeds a prescribed value; and a command value modifier operable to multiply the move command value by $\frac{1}{2}n$ (n=natural numbers including 1 and over) when the move command value exceeds the prescribed value, and feeding the resulting multiplied value into said A & D processor.

13. A controller as claimed in claim 11, further comprising:

a differential value judge section operable to judge a difference between adjacent sample periods when the move command values generated from said move command generator vary in adjacent sample periods;

a zero command generator operable to generate a zero command; and a command switch section operable to switch the move command to the zero command and outputs the zero command into said A & D processor when the difference exceeds a prescribed value, said command switch section successively outputs the zero commands for N sample periods when said FIR filter of said A & D processor has N steps.

14. A controller as claimed in claim 11, wherein said move command generator outputs a time span of each sample period together with a move command value per sample period, and wherein said A & D processor comprises:

a FIR filter providing a filtering process to the move command; and another FIR filter providing a filtering process to the sample time span.

15. A controller comprising:

an acceleration and deceleration (A & D) processor operable to vary an A & D time through varying a cut-off frequency of a filter;

a command value judge section operable to judge whether a move command generated by a move command generator exceeds a prescribed value; and a command value modifier operable to multiply the move command value by $\frac{1}{2}n$ (n=natural numbers including 1 and over) when the move command value exceeds the prescribed value, and feeding the resulting multiplied value into said A & D processor.

16. A controller as claimed in claim 15, wherein said move command generator outputs a time span of each sample period together with a move command value per sample period, and wherein said A & D processor comprises:

a FIR filter providing a filtering process to the move command; and another FIR filter providing a filtering process to the sample time span.

17. A controller comprising:

an acceleration and deceleration (A & D) processor operable to vary an A & D time through varying a cut-off frequency of a filter;

a differential value judge section operable to judge a difference between adjacent sample periods when the move command values generated from the move command generator vary in adjacent sample periods;

a zero command generator operable to generate a zero command; and a command switch section operable to switch the move command to the zero command and outputs the zero command into said A & D processor when the difference exceeds a prescribed value, said command switch section successively outputs the zero commands for N sample periods when said FIR filter of said A & D processor has N steps.

18. A method of control comprising:

interpolation calculating for dividing move data of a robot arm tip position into each sample period, the data fed from a position teaching section;

calculating load inertia;

calculating gravity torque;

calculating an optimum acceleration and deceleration (A & D) time by using the load inertia and the gravity torque;

providing an A & D process to move data of each sample time calculated in said interpolation calculating based on the A & D time; and controlling each motor based on the move data processed by said A & D processing.

19. A method of control comprising:

an interpolation calculating for dividing move data of a robot arm tip position into each sample period, the data fed from a position teaching section;

calculating a straight line distance between the motor and the robot arm tip, and a horizontal component of the distance; and calculating load inertia as a function of a straight line distance between a motor and the robot arm tip as well as gravity torque as a function of a horizontal component of the straight line distance, thereby calculating an optimum acceleration and deceleration time.

20. A method of control comprising:

an acceleration and deceleration (A & D) processing for varying an A & D time through varying a cut-off frequency of a filter;

generating a move command;

calculating a coefficient that accelerates and decelerates a motor, a total of the coefficients is "1" (one);

wherein said A & D processing is performed by using N (N=natural number including 2 and over) steps of FIR filter, and said A & D processing comprises:
    shifting a move command tapped off from a move command generator by N−1 pieces of shift registers coupled in series;
    multiplying an input move command value and move command values stored in each shift register respectively by the coefficients calculated in a coefficient calculator, said multiplication is performed in N pieces of multipliers; and
    adding the resulting multiplied move command values in said multiplying by N−1 pieces of adders; and
controlling the motor based on an output from the adders.

21. A method of control as claimed in claim 20, further comprising:

judging whether a move command generated at said move command generating exceeds a prescribed value; and multiplying the move command value by ½n (n=natural numbers including 1 and over) when the move command value exceeds the prescribed value, and feeding the resulting multiplied value into an A & D processor successively for 2n sample periods.

22. A method of control as claimed in claim 20, further comprising:

judging a difference between adjacent sample periods when the move command values generated at said move command generating vary in adjacent sample periods;

generating a zero command; and switching the move command to the zero command and outputs the zero command into an A & D processor when the difference exceeds a prescribed value, outputting the zero commands successively for N sample periods when the FIR (finite impulse response) filter of the A & D processor has N steps.

23. A method of control as claimed in claim 20, further comprising:

outputting a time span of each sample period together with a move command value per sample period in a move command generator;

providing a filtering process to the move command in a FIR (finite impulse response) filter; and providing a filtering process to the time span of the sample period in another said FIR filter through synchronizing with said move command filtering process.

24. A method of control comprising:

an acceleration and deceleration (A & D) processing for varying an A & D time through varying a cut-off frequency of a filter;

generating a move command that drives the motor;

calculating coefficients that performs A & D to the motor;

an A & D processing with a plurality of FIR (finite impulse response) filters, wherein said A & D processing comprises:
    multiplying the move command by coefficients that are calculated in said coefficient calculating and sum up to "1" (one) in N pieces of multipliers;
    providing the A & D process to the move command multiplied by the coefficients that sum up to "1" (one) through the N pieces of FIR filters; and
    adding outputs from the N pieces of FIR filters through N pieces of adders; and
controlling a motor based on outputs from the adders.

25. A method of control as claimed in claim 24, further comprising:

judging whether a move command generated at said move command generating exceeds a prescribed value; and multiplying the move command value by ½n (n=natural numbers including 1 and over) when the move command value exceeds the prescribed value, and feeding the resulting multiplied value into an A & D processor successively for 2n sample periods.

26. A method of control as claimed in claim 24, further comprising:

judging a difference between adjacent sample periods when the move command values generated at said move command generating vary in adjacent sample periods;

generating a zero command; and switching the move command to the zero command and outputs the zero command into an A & D processor when the difference exceeds a prescribed value, outputting the zero commands successively for N sample periods when the FIR (finite impulse response) filter of the A & D processor has N steps.

27. A method of control as claimed in claim 24, further comprising:

outputting a time span of each sample period together with a move command value per sample period in a move command generator;

providing a filtering process to the move command in a FIR (finite impulse response) filter; and providing a filtering process to the time span of the sample period in another FIR filter through synchronizing with said move command filtering process.

28. A method of control comprising:

an acceleration and deceleration (A & D) processing for varying an A & D time through varying a cut-off frequency of a filter;

generating a move command;

calculating a filter coefficient that accelerates and decelerates a motor, a total of the coefficients is "1" (one);

wherein said A & D processing is performed by using N (N=natural number including 2 and over) steps of FIR (finite impulse response) filter, and said A & D processing comprises:

shifting a move command tapped off at said move command generating by N−1 pieces of shift registers coupled in series;

multiplying an input move command value and move command values stored in each shift register respectively by the coefficients calculated in said coefficient calculating, said multiplying is performed in N pieces of multipliers;

adding outputs from the multipliers through N−1 pieces of adders; and shifting a coefficient from said filter coefficient calculating in synchronizing with a shift of the shift register, thereby rewriting a coefficient of the multipliers; and controlling the motor based on outputs from the adders.

29. A method of control as claimed in claim 28, further comprising:

judging whether a move command generated at said move command generating step exceeds a prescribed value; and multiplying the move command value by ½n (n=natural numbers including 1 and over) when the move command value exceeds the prescribed value, and feeding the resulting multiplied value into an A & D processor successively for 2n sample periods.

30. A method of control as claimed in claim 28, further comprising:

judging a difference between adjacent sample periods when the move command values generated at said move command generating vary in adjacent sample periods;

generating a zero command; and switching the move command to the zero command and outputs the zero command into an A & D processor when the difference exceeds a prescribed value, outputting the zero commands successively for N sample periods when the FIR (finite impulse response) filter of the A & D processor has N steps.

31. A method of control as claimed in claim 28, further comprising:

outputting a time span of each sample period together with a move command value per sample period in a move command generator;

providing a filtering process to the move command in a FIR (finite impulse response) filter; and providing a filtering process to the time span of the sample period in another FIR filter through synchronizing with said move command filtering process.

32. A method of control comprising:

an acceleration and deceleration (A & D) processing for varying an A & D time through varying a cut-off frequency of a filter;

judging whether a move command generated at said move command generating exceeds a prescribed value; and multiplying the move command value by ½n (n=natural numbers including 1 and over) when the move command value exceeds the prescribed value, and feeding the resulting multiplied value into an A & D processor successively for 2n sample periods.

33. A method of control as claimed in claim 32, further comprising:

outputting a time span of each sample period together with a move command value per sample period in a move command generator;

providing a filtering process to the move command in a FIR (finite impulse response) filter; and providing a filtering process to the time span of the sample period in another FIR filter through synchronizing with said move command filtering process.

34. A method of control comprising:

an acceleration and deceleration (A & D) processing for varying an A & D time through varying a cut-off frequency of a filter;

judging a difference between adjacent sample periods when the move command values generated at said move command generating vary in adjacent sample periods;

generating a zero command; and switching the move command to the zero command and outputs the zero command into an A & D processor when the difference exceeds a prescribed value, outputting the zero commands successively for N sample periods when the FIR (finite impulse response) filter of the A & D processor has N steps.

35. A method of control comprising:

an acceleration and deceleration (A & D) processing for varying an A & D time through varying a cut-off frequency of a filter;

outputting a time span of each sample period together with a move command value per sample period in a move command generator;

providing a filtering process to the move command in a FIR (finite impulse response) filter; and providing a filtering process to the time span of the sample period in another FIR filter through synchronizing with said move command filtering process.

* * * * *